(12) United States Patent
Christiansson et al.

(10) Patent No.: US 8,780,066 B2
(45) Date of Patent: Jul. 15, 2014

(54) TOUCH DETERMINATION BY TOMOGRAPHIC RECONSTRUCTION

(75) Inventors: Tomas Christiansson, Torna-Hällestad (SE); Peter Juhlin, Lund (SE)

(73) Assignee: Flatfrog Laboratories AB, Lund (SE)

( * ) Notice: Subject to any disclaimer, the term of this patent is extended or adjusted under 35 U.S.C. 154(b) by 0 days.

(21) Appl. No.: 13/695,505

(22) PCT Filed: Apr. 28, 2011

(86) PCT No.: PCT/SE2011/050520
§ 371 (c)(1),
(2), (4) Date: Oct. 31, 2012

(87) PCT Pub. No.: WO2011/139213
PCT Pub. Date: Nov. 10, 2011

(65) Prior Publication Data
US 2013/0044073 A1 Feb. 21, 2013

Related U.S. Application Data

(60) Provisional application No. 61/282,973, filed on May 3, 2010.

(30) Foreign Application Priority Data

May 3, 2010 (SE) ...................................... 1050434
Oct. 11, 2010 (SE) ...................................... 1051062

(51) Int. Cl.
*G06F 3/041* (2006.01)
*G06F 3/042* (2006.01)

(52) U.S. Cl.
CPC .... *G06F 3/0421* (2013.01); *G06F 2203/04109* (2013.01)
USPC ........... 345/173; 345/174; 345/175; 345/176; 345/177; 178/18.01; 178/18.09

(58) Field of Classification Search
CPC .................... G06F 2203/04109; G06F 3/0421; G06F 2203/04104; G06F 3/041; G06F 3/046
USPC ................................ 345/173–178; 178/18.09
See application file for complete search history.

(56) References Cited

U.S. PATENT DOCUMENTS

| 3,673,327 A | 6/1972 | Johnson et al. |
| 4,254,333 A | 3/1981 | Bergstrom |

(Continued)

FOREIGN PATENT DOCUMENTS

| WO | WO 02/07072 | 1/2002 |
| WO | WO 2005/026938 | 3/2005 |

(Continued)

OTHER PUBLICATIONS

International Search Report and Written Opinion issued in International Application No. PCT/SE2010/051107 dated Jan. 24, 2011.

(Continued)

*Primary Examiner* — Gregory J Tryder
(74) *Attorney, Agent, or Firm* — Harness, Dickey & Pierce, P.L.C.

(57) ABSTRACT

A touch-sensitive apparatus comprises a panel configured to conduct signals from a plurality of peripheral incoupling points to a plurality of peripheral outcoupling points. Actual detection lines are defined between pairs of incoupling and outcoupling points to extend across a surface portion of the panel. The signals may be in the form of light, and objects touching the surface portion may affect the light via frustrated total internal reflection (FTIR). A signal generator is coupled to the incoupling points to generate the signals, and a signal detector is coupled to the outcoupling points to generate an output signal. A data processor operates on the output signal to enable identification of touching objects. The output signal is processed (40) to generate a set of data samples, which are indicative of detected energy for at least a subset of the actual detection lines. The set of data samples is processed (42) to generate a set of matched samples, which are indicative of estimated detected energy for fictitious detection lines that have a location on the surface portion that matches a standard geometry for tomographic reconstruction. The set of matched samples is processed (44, 46) by tomographic reconstruction to generate data indicative of a distribution of an energy-related parameter within at least part of the surface portion.

25 Claims, 25 Drawing Sheets

(56) References Cited

U.S. PATENT DOCUMENTS

| | | | |
|---|---|---|---|
| 5,345,490 A | 9/1994 | Finnigan et al. | |
| 5,577,501 A * | 11/1996 | Flohr et al. | 600/425 |
| 5,740,224 A * | 4/1998 | Muller et al. | 378/11 |
| 5,767,517 A * | 6/1998 | Hawkins | 250/363.04 |
| 6,940,286 B2 * | 9/2005 | Wang et al. | 324/450 |
| 6,965,836 B2 * | 11/2005 | Richardson | 702/57 |
| 6,972,753 B1 | 12/2005 | Kimura et al. | |
| 7,432,893 B2 | 10/2008 | Ma et al. | |
| 8,149,211 B2 * | 4/2012 | Hayakawa et al. | 345/156 |
| 8,482,547 B2 * | 7/2013 | Christiansson et al. | 345/175 |
| 8,542,217 B2 * | 9/2013 | Wassvik et al. | 345/175 |
| 8,581,884 B2 * | 11/2013 | Fåhraeus et al. | 345/176 |
| 8,686,974 B2 * | 4/2014 | Christiansson et al. | 345/175 |
| 8,692,807 B2 * | 4/2014 | Fohraeus et al. | 345/175 |
| 2002/0075243 A1 * | 6/2002 | Newton | 345/173 |
| 2004/0130338 A1 * | 7/2004 | Wang et al. | 324/694 |
| 2004/0252091 A1 | 12/2004 | Ma et al. | |
| 2006/0114237 A1 | 6/2006 | Crockett et al. | |
| 2007/0075648 A1 | 4/2007 | Blythe et al. | |
| 2008/0122803 A1 | 5/2008 | Izadi et al. | |
| 2009/0135162 A1 | 5/2009 | Wijdeven et al. | |
| 2009/0153519 A1 * | 6/2009 | Suarez Rovere | 345/173 |
| 2010/0142823 A1 | 6/2010 | Wang et al. | 382/195 |
| 2011/0074734 A1 * | 3/2011 | Wassvik et al. | 345/175 |
| 2011/0074735 A1 * | 3/2011 | Wassvik et al. | 345/175 |
| 2011/0090176 A1 * | 4/2011 | Christiansson et al. | 345/175 |
| 2011/0102374 A1 * | 5/2011 | Wassvik et al. | 345/175 |
| 2011/0163996 A1 * | 7/2011 | Wassvik et al. | 345/175 |
| 2011/0227874 A1 * | 9/2011 | Fahraeus et al. | 345/175 |
| 2012/0068973 A1 * | 3/2012 | Christiansson et al. | 345/175 |
| 2012/0162142 A1 * | 6/2012 | Christiansson et al. | 345/175 |
| 2012/0162144 A1 * | 6/2012 | Fahraeus et al. | 345/178 |
| 2012/0200538 A1 * | 8/2012 | Christiansson et al. | 345/175 |
| 2012/0212441 A1 * | 8/2012 | Christiansson et al. | 345/173 |
| 2012/0256882 A1 * | 10/2012 | Christiansson et al. | 345/175 |
| 2012/0268403 A1 * | 10/2012 | Christiansson | 345/175 |
| 2013/0021300 A1 * | 1/2013 | Wassvik | 345/175 |
| 2013/0044073 A1 * | 2/2013 | Christiansson et al. | 345/173 |
| 2013/0127790 A1 * | 5/2013 | Wassvik | 345/175 |
| 2013/0154983 A1 * | 6/2013 | Christiansson et al. | 345/173 |
| 2013/0201142 A1 * | 8/2013 | Suarez Rovere | 345/173 |
| 2013/0249833 A1 * | 9/2013 | Christiansson et al. | 345/173 |
| 2013/0275082 A1 * | 10/2013 | Follmer et al. | 702/155 |
| 2013/0285968 A1 * | 10/2013 | Christiansson et al. | 345/173 |
| 2013/0300716 A1 * | 11/2013 | Craven-Bartle et al. | 345/175 |
| 2013/0307795 A1 * | 11/2013 | Suarez Rovere | 345/173 |
| 2013/0342490 A1 * | 12/2013 | Wallander et al. | 345/173 |
| 2014/0002400 A1 * | 1/2014 | Christiansson et al. | 345/173 |
| 2014/0055421 A1 * | 2/2014 | Christiansson et al. | 345/175 |
| 2014/0085241 A1 * | 3/2014 | Christiansson et al. | 345/173 |
| 2014/0125633 A1 * | 5/2014 | F Hraeus et al. | 345/175 |

FOREIGN PATENT DOCUMENTS

| | | |
|---|---|---|
| WO | WO 2006/095320 | 9/2006 |
| WO | WO 2008/032270 | 3/2008 |
| WO | WO 2009/000289 | 12/2008 |
| WO | WO 2009/048365 | 4/2009 |
| WO | WO 2009/102681 | 8/2009 |
| WO | WO 2010/006882 | 1/2010 |
| WO | WO 2010/006883 | 1/2010 |
| WO | WO 2010/006884 | 1/2010 |
| WO | WO 2010/006885 | 1/2010 |
| WO | WO 2010/006886 | 1/2010 |
| WO | WO 2010/134865 | 11/2010 |
| WO | WO 2011/028169 | 3/2011 |
| WO | WO 2011/049511 | 4/2011 |
| WO | WO 2011/049512 | 4/2011 |
| WO | WO 2011/049513 | 4/2011 |
| WO | WO 2011/078769 | 6/2011 |

OTHER PUBLICATIONS

Christer Ericson, "Real-Time Collision Detection", The Morgan Kaufmann Series in Interactive 3D Technology (2005) Chapters 5-9, pp. 125-412.

Joseph O'Rourke, "Computational Geometry in C", Second Edition, Cambridge University Press, (1998), pp. 252-264.

Kak et al, "Principles of Computerized Tomographic Imaging", (1999), The Institute of Electrical Engineers, Inc.

Natterer, et al., "Mathematical Methods in Image Reconstruction", Society for Industrial and Applied Mathematics, (2001).

International Search Report and Written Opinion issued in International Application No. PCT/SE2010/051105 dated Nov. 16, 2010.

Natterer, "The Mathematics of Computerized Tomography", Classics in Applied Mathematics; 32, 2001.

Press, et al., "Numerical Recipes the Art of Scientific Computing", Third Edition, Cambridge University Press, 2007, pp. 1-1235.

Barzilai et al., "Two-Point Step Size Gradient Methods", IMA Journal of Numerical Analysis, 1988, pp. 141-148.

Karsten Fourmont, Non-Equispaced Fast Fourier Transforms with Applications to Tomography, The Journal of Fourier Analysis and Applications, vol. 9, Issue 5, 2003, pp. 431-450.

International Search Report and Written Opinion issued in International Application No. PCT/SE2010/051103 dated Jan. 25, 2011.

European Search Report issued in European Application No. 11777650.0, dated Nov. 2, 2013.

\* cited by examiner

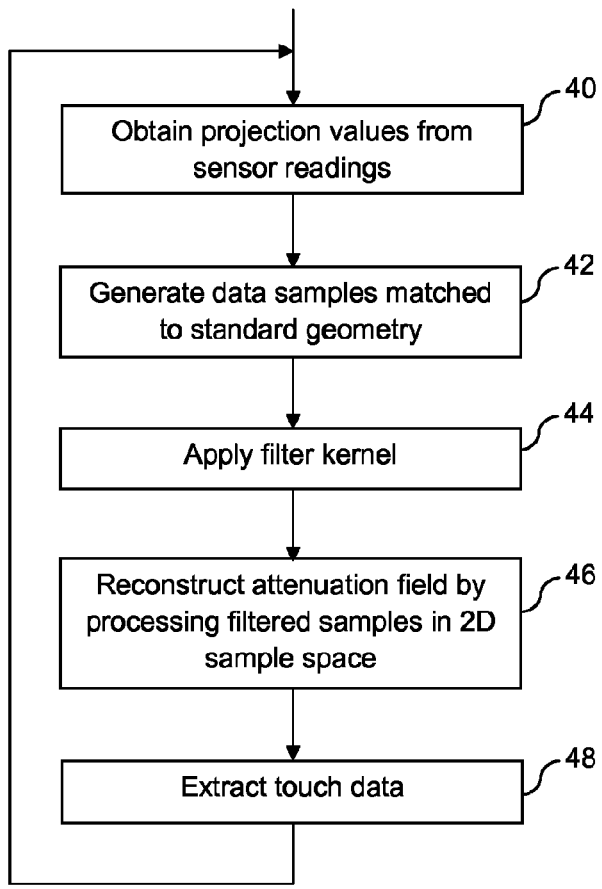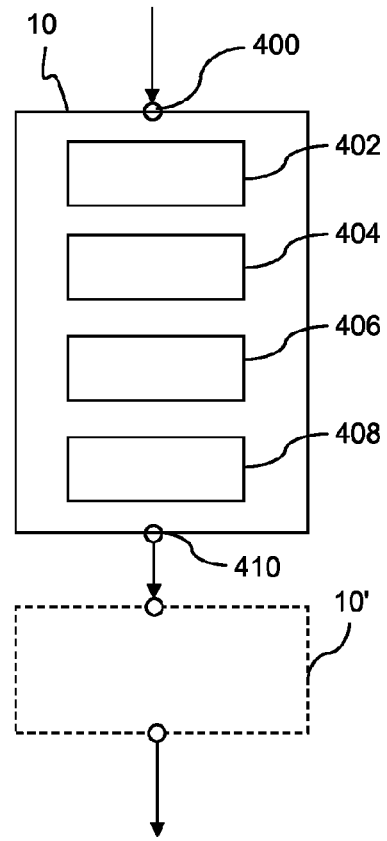
Fig. 4A
Fig. 4B
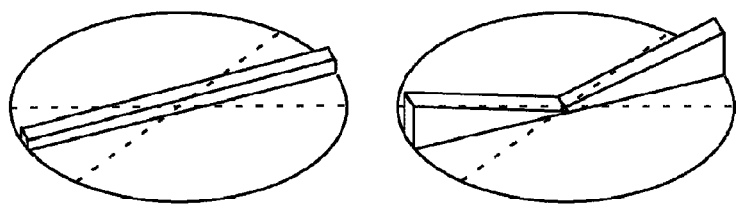
Fig. 6

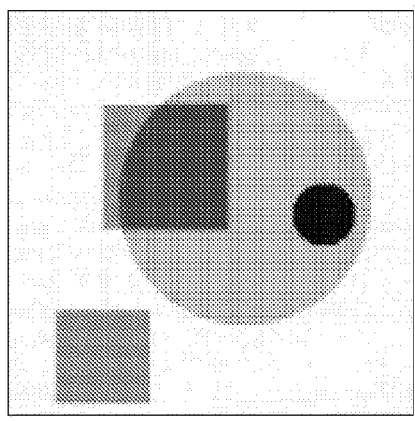
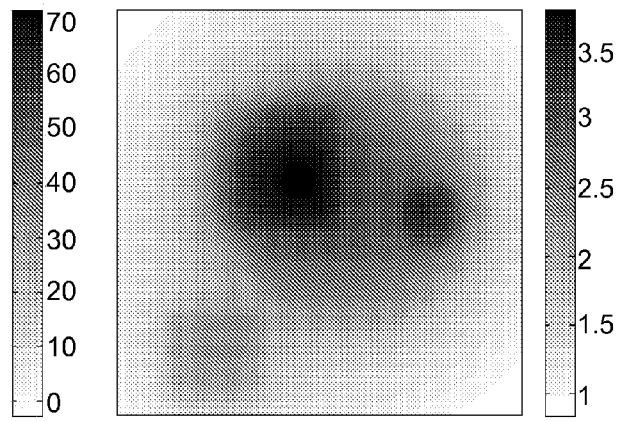
Fig. 8G          Fig. 8H
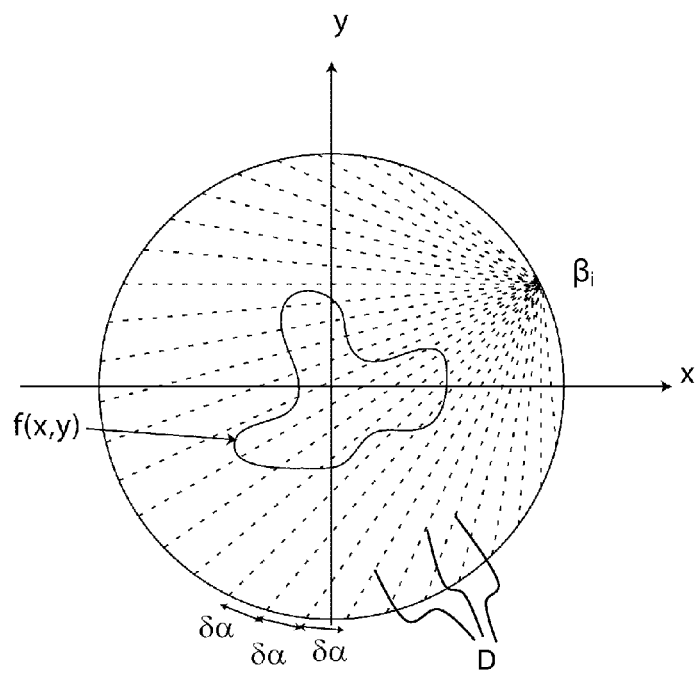
Fig. 9

TOUCH DETERMINATION BY TOMOGRAPHIC RECONSTRUCTION

CROSS-REFERENCE TO RELATED APPLICATIONS

This is a National Phase of PCT/SE2011/050520 filed Apr. 28, 2011 which claims priority to provisional U.S. Application No. 61/282,973 filed May 3, 2010, SE Application No. 1050434-8 filed May 3, 2010, and to SE Application No. 1051062-6 filed Oct. 11, 2010.

TECHNICAL FIELD

The present invention relates to touch-sensitive panels and data processing techniques in relation to such panels.

BACKGROUND ART

To an increasing extent, touch-sensitive panels are being used for providing input data to computers, electronic measurement and test equipment, gaming devices, etc. The panel may be provided with a graphical user interface (GUI) for a user to interact with using e.g. a pointer, stylus or one or more fingers. The GUI may be fixed or dynamic. A fixed GUI may e.g. be in the form of printed matter placed over, under or inside the panel. A dynamic GUI can be provided by a display screen integrated with, or placed underneath, the panel or by an image being projected onto the panel by a projector.

There are numerous known techniques for providing touch sensitivity to the panel, e.g. by using cameras to capture light scattered off the point(s) of touch on the panel, or by incorporating resistive wire grids, capacitive sensors, strain gauges, etc into the panel.

US2004/0252091 discloses an alternative technique which is based on frustrated total internal reflection (FTIR). Light sheets are coupled into a panel to propagate inside the panel by total internal reflection. When an object comes into contact with a surface of the panel, two or more light sheets will be locally attenuated at the point of touch. Arrays of light sensors are located around the perimeter of the panel to detect the received light for each light sheet. A coarse tomographic reconstruction of the light field across the panel surface is then created by geometrically back-tracing and triangulating all attenuations observed in the received light. This is stated to result in data regarding the position and size of each contact area.

US2009/0153519 discloses a panel capable of conducting signals. A "tomograph" is positioned adjacent the panel with signal flow ports arrayed around the border of the panel at discrete locations. Signals (b) measured at the signal flow ports are tomographically processed to generate a two-dimensional representation (x) of the conductivity on the panel, whereby touching objects on the panel surface can be detected. The presented technique for tomographic reconstruction is based on a linear model of the tomographic system, $Ax=b$. The system matrix A is calculated at factory, and its pseudo inverse $A^{-1}$ is calculated using Truncated SVD algorithms and operated on the measured signals to yield the two-dimensional (2D) representation of the conductivity: $x=A^{-1}b$. The suggested method is both demanding in the term of processing and lacks suppression of high frequency components, possibly leading to much noise in the 2D representation.

US2009/0153519 also makes a general reference to Computer Tomography (CT). CT methods are well-known imaging methods which have been developed for medical purposes. CT methods employ digital geometry processing to reconstruct an image of the inside of an object based on a large series of projection measurements through the object. Various CT methods have been developed to enable efficient processing and/or precise image reconstruction, e.g. Filtered Back Projection, ART, SART, etc. Often, the projection measurements are carried out in accordance with a standard geometry which is given by the CT method. Clearly, it would be desirable to capitalize on existing CT methods for reconstructing the 2D distribution of an energy-related parameter (light, conductivity, etc) across a touch surface based on a set of projection measurements.

SUMMARY

It is an object of the invention to enable touch determination on a panel based on projection measurements by use of existing CT methods.

Another objective is to provide a technique that enables determination of touch-related data at sufficient precision to discriminate between a plurality of objects in simultaneous contact with a touch surface.

This and other objects, which may appear from the description below, are at least partly achieved by means of a method of enabling touch determination, a computer program product, a device for enabling touch determination, and a touch-sensitive apparatus according to the independent claims, embodiments thereof being defined by the dependent claims.

A first aspect of the invention is a method of enabling touch determination based on an output signal from a touch-sensitive apparatus, which comprises a panel configured to conduct signals from a plurality of peripheral incoupling points to a plurality of peripheral outcoupling points, thereby defining actual detection lines that extend across a surface portion of the panel between pairs of incoupling and outcoupling points, at least one signal generator coupled to the incoupling points to generate the signals, and at least one signal detector coupled to the outcoupling points to generate the output signal. The method comprises: processing the output signal to generate a set of data samples, wherein the data samples are indicative of detected energy for at least a subset of the actual detection lines; processing the set of data samples to generate a set of matched samples, wherein the matched samples are indicative of estimated detected energy for fictitious detection lines that have a location on the surface portion that matches a standard geometry for tomographic reconstruction; and processing the set of matched samples by tomographic reconstruction to generate data indicative of a distribution of an energy-related parameter within at least part of the surface portion.

In one embodiment, the step of processing the output signal comprises: generating the data samples in a two-dimensional sample space, wherein each data sample is representative of an actual detection line and is defined by a signal value and two dimension values that define the location of the actual detection line on the surface portion.

In one embodiment, the step of processing the set of data samples comprises: generating estimated signal values of the matched samples at predetermined locations in the two-dimensional sample space, wherein the predetermined locations correspond to the fictitious detection lines. The estimated signal values may be generated by interpolation based on the signal values of the data samples, and each estimated signal value may be generated by interpolation of the signal values of neighboring data samples in the two-dimensional sample space.

In one embodiment, the step of processing the set of data samples further comprises: obtaining a predetermined two-dimensional interpolation function with nodes corresponding to the set of data samples, and calculating the estimated signal values according to the interpolation function and based on the signal values of the data samples. The method may further comprise a step of receiving exclusion data identifying one or more data samples to be excluded, wherein the step of processing the data samples comprises identifying the node corresponding to each data sample to be excluded, re-designing the predetermined interpolation function without each thus-identified node, and calculating the estimated signal values according to the re-designed interpolation scheme and based on the signal values of the data samples in the nodes of the re-designed interpolation scheme.

In one embodiment, the step of generating estimated signal values comprises, for each matched sample: calculating a weighted contribution to the matched sample from at least a subset of the data samples, and aggregating the weighted contributions, wherein each weighted contribution is calculated as a function of the signal value of the data sample and a distance in the sample space between the matched sample and the data sample.

In one embodiment, the matched samples are arranged as rows and/or columns in the two-dimensional sample space. The matched samples may be arranged with equidistant spacing within each of said rows and/or columns.

In an alternative embodiment, the step of processing the set of data samples comprises: operating a two-dimensional Fourier transformation algorithm designed for irregularly sampled data on the set of data samples to generate a set of Fourier coefficients arranged in a Cartesian grid; and generating the estimated signal values by operating a two-dimensional inverse FFT algorithm on the set of Fourier coefficients to generate the set of matched samples.

In one embodiment, the step of processing the set of matched samples comprises: applying a one-dimensional high-pass filtering of the matched samples in the two-dimensional sample space to generate filtered samples, and processing the filtered samples to generate at set of back projection values indicative of said distribution.

In one embodiment, the surface portion defines a sampling area in the two-dimensional sample space, and the step of processing comprises, if the actual detection lines given by the geometric arrangement of incoupling and outcoupling points result in at least one contiguous region without data samples within the sampling area, the steps of: obtaining a predetermined set of estimated sampling points within the contiguous region, and, for each estimated sampling point, identifying the location of a corresponding fictitious detection line on the surface portion; identifying, for each intersection point between the corresponding fictitious detection line and the actual detection lines and/or between the corresponding fictitious detection line and the fictitious detection lines for the set of matched samples, an intersection point value as the smallest signal value of all data samples corresponding to the actual detection lines associated with the intersection point; and calculating a signal value of the estimated sampling point as a function of the intersection point values. In one implementation, the signal value of the estimated sampling point may be given by the largest intersection point value. In another implementation, the method further comprises, for each estimated sampling point: identifying a number of local maxima in the intersection point values, and calculating the signal value of the estimated sampling point as a combination of the local maxima.

In one embodiment, the dimension values comprise a rotation angle of the detection line in the plane of the panel, and a distance of the detection line in the plane of the panel from a predetermined origin.

In another embodiment, the dimension values comprise an angular location of the incoupling or outcoupling point of the detection line, and a rotation angle of the detection line in the plane of the panel. In one implementation, the standard geometry is a fan geometry, the touch surface has a non-circular perimeter, and the angular location is defined by an intersection between the detection line and a fictitious circle arranged to circumscribe the touch surface.

In one embodiment, the standard geometry is one of a parallel geometry and a fan geometry.

In one embodiment, the signals comprise one of electrical energy, light, magnetic energy, sonic energy and vibration energy.

In one embodiment, the panel defines a touch surface and an opposite surface, wherein said at least one signal generator is arranged to provide light inside the panel, such that the light propagates from the incoupling points by internal reflection between the touch surface and the opposite surface to the outcoupling points for detection by said at least one signal detector, and wherein the touch-sensitive apparatus is configured such that the propagating light is locally attenuated by one or more objects touching the touch surface.

A second aspect of the invention is a computer program product comprising computer code which, when executed on a data-processing system, is adapted to carry out the method of the first aspect.

A third aspect of the invention is a device for enabling touch determination based on an output signal of a touch-sensitive apparatus, which comprises a panel configured to conduct signals from a plurality of peripheral incoupling points to a plurality of peripheral outcoupling points, thereby defining actual detection lines that extend across a surface portion of the panel between pairs of incoupling and outcoupling points, means for generating the signals at the incoupling points, and means for generating the output signal based on detected signals at the outcoupling points. The device comprises: means for receiving the output signal; means for processing the output signal to generate a set of data samples, wherein the data samples are indicative of detected energy for at least a subset of the actual detection lines; means for processing the set of data samples to generate a set of matched samples, wherein the matched samples are indicative of estimated detected energy for fictitious detection lines that have a location on the surface portion that matches a standard geometry for tomographic reconstruction; and means for processing the set of matched samples by tomographic reconstruction to generate data indicative of a distribution of an energy-related parameter within at least part of the surface portion.

A fourth aspect of the invention is a touch-sensitive apparatus, comprising: a panel configured to conduct signals from a plurality of peripheral incoupling points to a plurality of peripheral outcoupling points, thereby defining actual detection lines that extend across a surface portion of the panel between pairs of incoupling and outcoupling points; means for generating the signals at the incoupling points; means for generating an output signal based on detected signals at the outcoupling points; and the device for enabling touch determination according to the third aspect.

A fifth aspect of the invention is a touch-sensitive apparatus, comprising: a panel configured to conduct signals from a plurality of peripheral incoupling points to a plurality of peripheral outcoupling points, thereby defining actual detection lines that extend across a surface portion of the panel between pairs of incoupling and outcoupling points; at least one signal generator coupled to the incoupling points to generate the signals; at least one signal detector coupled to the outcoupling points to generate an output signal; and a signal processor connected to receive the output signal and configured to: process the output signal to generate a set of data samples, wherein the data samples are indicative of detected energy for at least a subset of the actual detection lines, process the set of data samples to generate a set of matched samples, wherein the matched samples are indicative of estimated detected energy for fictitious detection lines that have a location on the surface portion that matches a standard geometry for tomographic reconstruction, and process the set of matched samples by tomographic reconstruction to generate data indicative of a distribution of an energy-related parameter within at least part of the surface portion.

Any one of the embodiments of the first aspect can be combined with the second to fifth aspects.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

FIG. 4A is a flow chart of a reconstruction method, and FIG. 4B is a block diagram of a device that implements the method of FIG. 4A.

FIG. 6 illustrates the applicability of filtering for back projection processing.

FIGS. 8A-8H illustrate a starting point, intermediate results and final results of a back projection process using a parallel geometry.

FIG. 9 illustrates a fan geometry used in tomographic reconstruction.

DETAILED DESCRIPTION OF EXAMPLE EMBODIMENTS

Figure 1:
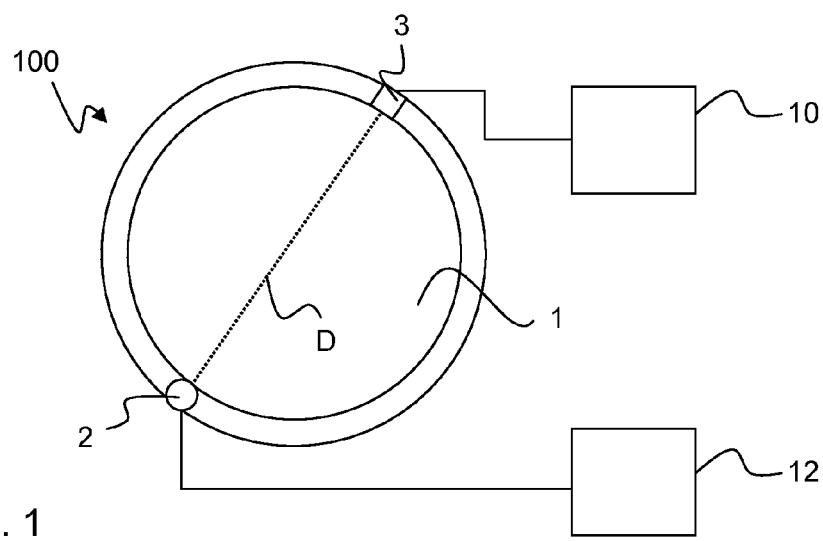
FIG. 1 is a plan view of a touch-sensitive apparatus.

The present invention relates to techniques for enabling extraction of touch data for at least one object, and typically multiple objects, in contact with a touch surface of a touch-sensitive apparatus. The description starts out by presenting the underlying concept of such a touch-sensitive apparatus, especially an apparatus operating by frustrated total internal reflection (FTIR) of light. Then follows an example of an overall method for touch data extraction involving tomographic reconstruction. The description continues to generally explain and exemplify the theory of tomographic reconstruction and its use of standard geometries. Finally, different inventive aspects of applying techniques for tomographic reconstruction for touch determination are further explained and exemplified.

Throughout the description, the same reference numerals are used to identify corresponding elements.

1. Touch-Sensitive Apparatus

FIG. 1 illustrates a touch-sensitive apparatus 100 which is based on the concept of transmitting energy of some form across a touch surface 1, such that an object that is brought into close vicinity of, or in contact with, the touch surface 1 causes a local decrease in the transmitted energy. The touch-sensitive apparatus 100 includes an arrangement of emitters and sensors, which are distributed along the periphery of the touch surface. Each pair of an emitter and a sensor defines a detection line, which corresponds to the propagation path for an emitted signal from the emitter to the sensor. In FIG. 1, only one such detection line D is illustrated to extend from emitter 2 to sensor 3, although it should be understood that the arrangement typically defines a dense grid of intersecting detection lines, each corresponding to a signal being emitted by an emitter and detected by a sensor. Any object that touches the touch surface along the extent of the detection line D will thus decrease its energy, as measured by the sensor 3.

The arrangement of sensors is electrically connected to a signal processor 10, which samples and processes an output signal from the arrangement. The output signal is indicative of the received energy at each sensor 3. As will be explained below, the signal processor 10 may be configured to process the output signal by a tomographic technique to recreate an image of the distribution of an energy-related parameter (for simplicity, referred to as "energy distribution" in the following) across the touch surface 1. The energy distribution may be further processed by the signal processor 10 or by a separate device (not shown) for touch determination, which may involve extraction of touch data, such as a position (e.g. x, y coordinates), a shape or an area of each touching object.

In the example of FIG. 1, the touch-sensitive apparatus 100 also includes a controller 12 which is connected to selectively control the activation of the emitters 2. The signal processor 10 and the controller 12 may be configured as separate units, or they may be incorporated in a single unit. One or both of the signal processor 10 and the controller 12 may be at least partially implemented by software executed by a processing unit.

The touch-sensitive apparatus 100 may be designed to be used with a display device or monitor, e.g. as described in the Background section. Generally, such a display device has a rectangular extent, and thus the touch-sensitive apparatus 100 (the touch surface 1) is also likely to be designed with a rectangular shape. Further, the emitters 2 and sensors 3 all have a fixed position around the perimeter of the touch surface 1. Thus, in contrast to a conventional tomographic apparatus used e.g. in the medical field, there will be no possibility of rotating the complete measurement system. As will be described in further detail below, this puts certain limitations on the use of standard tomographic techniques for recreating/reconstructing the energy distribution within the touch surface 1.

Figure 2A:
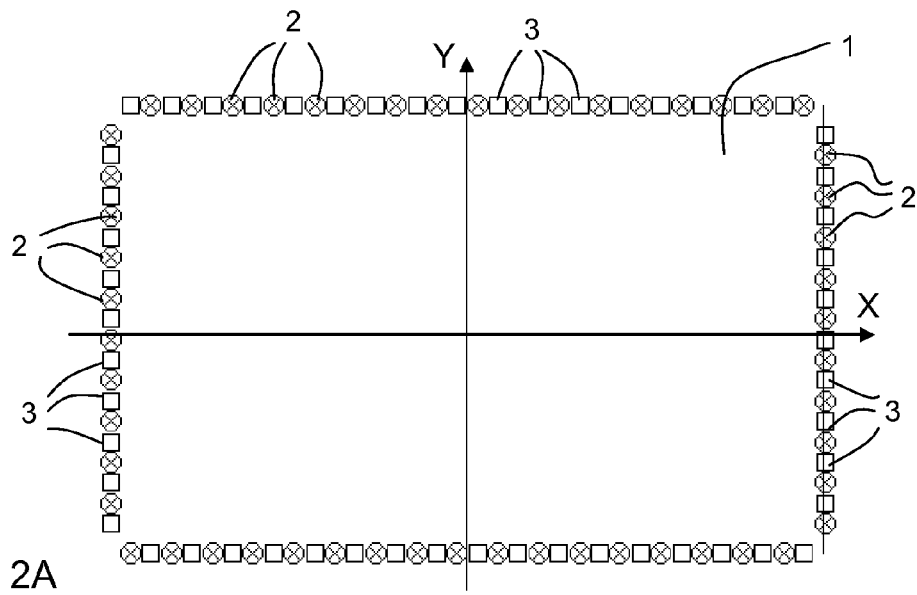
FIG. 2A-2B are top plan views of a touch-sensitive apparatus with an interleaved and non-interleaved arrangement, respectively, of emitters and sensors.
Figure 2B:
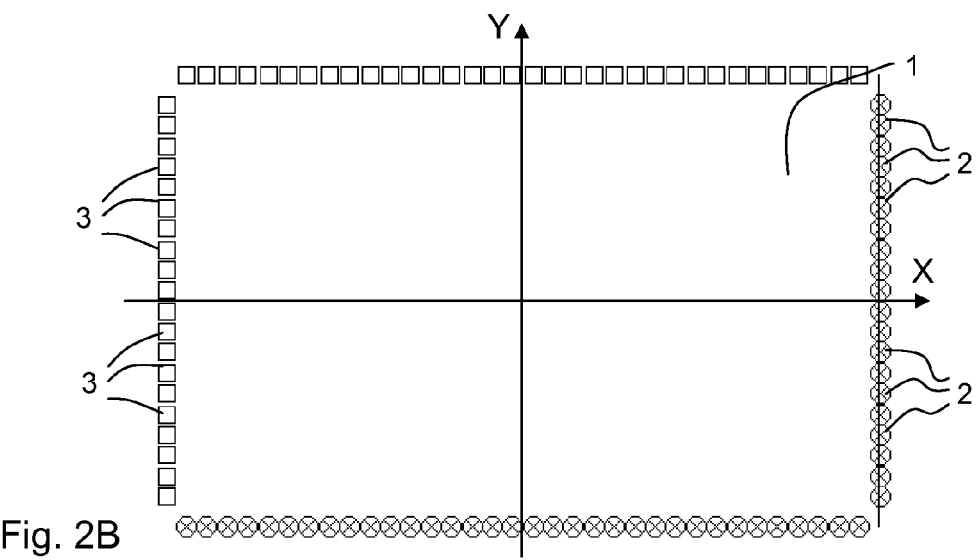

In the following, embodiments of the invention will be described in relation to two main arrangements of emitters 2 and sensors 3. A first main arrangement, shown in FIG. 2A, is denoted "interleaved arrangement" and has emitters 2 and sensors 3 placed one after the other along the periphery of the touch surface 1. Thus, every emitter 2 is placed between two sensors 3. The distance between neighboring emitters 2 is the same along the periphery. The same applies for the distance between neighboring sensors 3. A second main arrangement, shown in FIG. 2B, is denoted "non-interleaved arrangement" and has merely sensors 3 on two adjacent sides (i.e. sides connected via a corner), and merely emitters 2 on its other sides.

The interleaved arrangement may be preferable since it generates a more uniform distribution of detection lines. However, there are electro-optical aspects of the interleaved system that may favor the use of the non-interleaved arrangement. For example, the interleaved arrangement may require the emitters 2, which may be fed with high driving currents, to be located close to the sensors 3, which are configured to detect weak photo-currents. This may lead to undesired detection noise. The electrical connection to the emitters 2 and sensors 3 may also be somewhat demanding since the emitters 2 and sensors 3 are dispersed around the periphery of the touch surface 1. Thus, there may be reasons for using a non-interleaved arrangement instead of an interleaved arrangement, since the former obviates these potential obstacles.

It is to be understood that there are many variations and blends of these two types of arrangements. For example, the sensor-sensor, sensor-emitter, emitter-emitter distance(s) may vary along the periphery, and/or the blending of emitters and sensors may be different, e.g. there may be two or more emitters/sensors between every emitter/sensor, etc. Although the following examples are given for the first and second main arrangements, specifically a rectangular touch surface with a 16:9 aspect ratio, this is merely for the purpose of illustration, and the concepts of the invention are applicable irrespective of aspect ratio, shape of the touch surface, and arrangement of emitters and sensors.

In the embodiments shown herein, at least a subset of the emitters 2 may be arranged to emit energy in the shape of a beam or wave that diverges in the plane of the touch surface 1, and at least a subset of the sensors 3 may be arranged to receive energy over a wide range of angles (field of view). Alternatively or additionally, the individual emitter 2 may be configured to emit a set of separate beams that propagate to a number of sensors 3. In either embodiment, each emitter 2 transmits energy to a plurality of sensors 3, and each sensor 3 receives energy from a plurality of emitters 2.

The touch-sensitive apparatus 100 may be configured to permit transmission of energy in one of many different forms. The emitted signals may thus be any radiation or wave energy that can travel in and across the touch surface 1 including, without limitation, light waves in the visible or infrared or ultraviolet spectral regions, electrical energy, electromagnetic or magnetic energy, or sonic and ultrasonic energy or vibration energy.

Figure 3A:
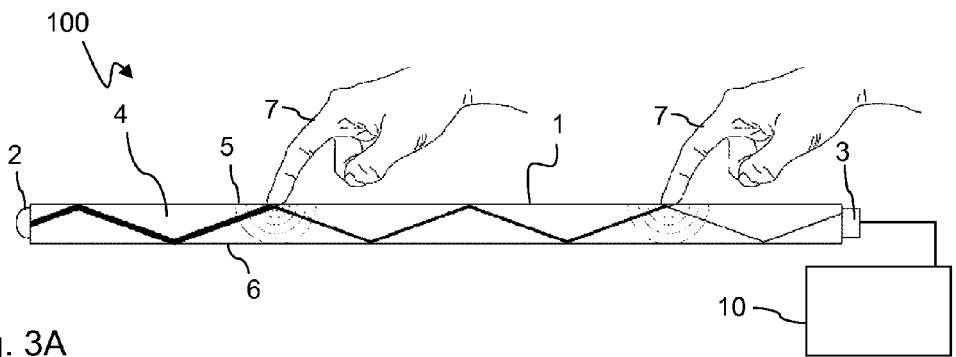
FIGS. 3A-3B are side and top plan views of touch-sensitive systems operating by frustrated total internal reflection (FTIR).

In the following, an example embodiment based on propagation of light will be described. FIG. 3A is a side view of a touch-sensitive apparatus 100 which includes a light transmissive panel 4, one or more light emitters 2 (one shown) and one or more light sensors 3 (one shown). The panel 4 defines two opposite and generally parallel surfaces 5, 6 and may be planar or curved. A radiation propagation channel is provided between two boundary surfaces 5, 6 of the panel 4, wherein at least one of the boundary surfaces allows the propagating light to interact with a touching object 7. Typically, the light from the emitter(s) 2 propagates by total internal reflection (TIR) in the radiation propagation channel, and the sensors 3 are arranged at the periphery of the panel 4 to generate a respective measurement signal which is indicative of the energy of received light.

As shown in FIG. 3A, the light may be coupled into and out of the panel 4 directly via the edge portion that connects the top and bottom surfaces 5, 6 of the panel 4. Alternatively, not shown, a separate coupling element (e.g. in the shape of a wedge) may be attached to the edge portion or to the top or bottom surface 5, 6 of the panel 4 to couple the light into and/or out of the panel 4. When the object 7 is brought sufficiently close to the boundary surface, part of the light may be scattered by the object 7, part of the light may be absorbed by the object 7, and part of the light may continue to propagate unaffected. Thus, when the object 7 touches a boundary surface of the panel (e.g. the top surface 5), the total internal reflection is frustrated and the energy of the transmitted light is decreased. This type of touch-sensitive apparatus is denoted "FTIR system" (FTIR—Frustrated Total Internal Reflection) in the following.

Figure 3B:
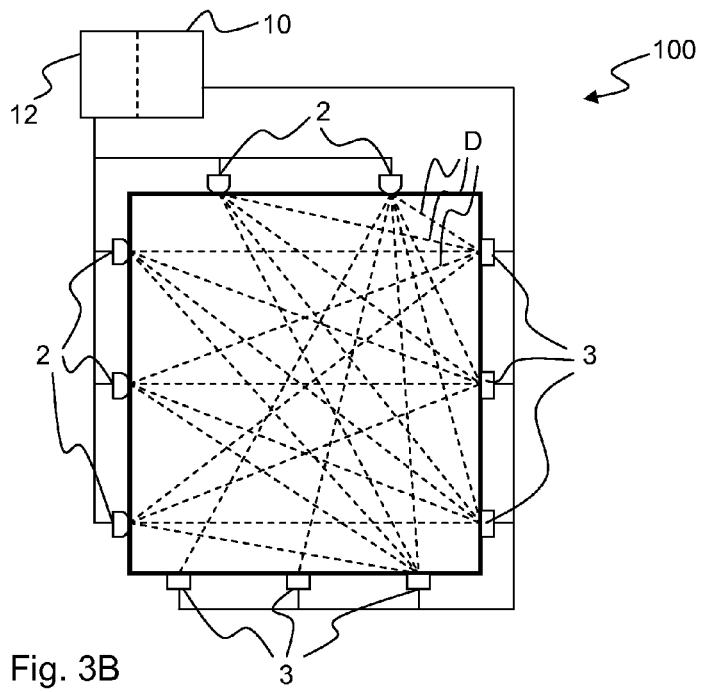

The touch-sensitive apparatus 100 may be operated to measure the energy of the light transmitted through the panel 4 on a plurality of detection lines. This may, e.g., be done by activating a set of spaced-apart emitters 2 to generate a corresponding number of light sheets inside the panel 4, and by operating a set of sensors 3 to measure the transmitted energy of each light sheet. Such an embodiment is illustrated in FIG. 3B, where each emitter 2 generates a beam of light that expands in the plane of the panel 4 while propagating away from the emitter 2. Each beam propagates from one or more entry or incoupling points within an incoupling site on the panel 4. Arrays of light sensors 3 are located around the perimeter of the panel 4 to receive the light from the emitters 2 at a number of spaced-apart outcoupling points within an outcoupling site on the panel 4. It should be understood that the incoupling and outcoupling points merely refer to the position where the beam enters and leaves, respectively, the panel 4. Thus, one emitter/sensor may be optically coupled to a number of incoupling/outcoupling points. In the example of FIG. 3B, however, the detection lines D are defined by individual emitter-sensor pairs.

The light sensors 3 collectively provide an output signal, which is received and sampled by the signal processor 10. The output signal contains a number of sub-signals, also denoted "projection signals", each representing the energy of light emitted by a certain light emitter 2 and received by a certain light sensor 3, i.e. the received energy on a certain detection line. Depending on implementation, the signal processor 10 may need to process the output signal for identification of the individual sub-signals. Irrespective of implementation, the signal processor 10 is able to obtain an ensemble of measurement values that contains information about the distribution of an energy-related parameter across the touch surface 1.

The light emitters 2 can be any type of device capable of emitting light in a desired wavelength range, for example a diode laser, a VCSEL (vertical-cavity surface-emitting laser), or alternatively an LED (light-emitting diode), an incandescent lamp, a halogen lamp, etc.

The light sensors 3 can be any type of device capable of detecting the energy of light emitted by the set of emitters, such as a photodetector, an optical detector, a photoresistor, a photovoltaic cell, a photodiode, a reverse-biased LED acting as photodiode, a charge-coupled device (CCD) etc.

The emitters 2 may be activated in sequence, such that the received energy is measured by the sensors 3 for each light sheet separately. Alternatively, all or a subset of the emitters 2 may be activated concurrently, e.g. by modulating the emitters 2 such that the light energy measured by the sensors 3 can be separated into the sub-signals by a corresponding demodulation.

Reverting to the emitter-sensor-arrangements in FIG. 2, the spacing between neighboring emitters 2 and sensors 3 in the interleaved arrangement (FIG. 2A) and between neighboring emitters 2 and neighboring sensors 3, respectively, in the non-interleaved arrangement (FIG. 2B) is generally from about 1 mm to about 20 mm. For practical as well as resolution purposes, the spacing is generally in the 2-10 mm range.

In a variant of the interleaved arrangement, the emitters 2 and sensors 3 may partially or wholly overlap, as seen in a plan view. This can be accomplished by placing the emitters 2 and sensors 3 on opposite sides of the panel 4, or in some equivalent optical arrangement.

It is to be understood that FIG. 3 merely illustrates one example of an FTIR system. Further examples of FTIR systems are e.g. disclosed in U.S. Pat. No. 6,972,753, U.S. Pat. No. 7,432,893, US2006/0114237, US2007/0075648, WO2009/048365, WO2010/006882, WO2010/006883, WO2010/006884, WO2010/006885, WO2010/006886, and International application No. PCT/SE2009/051364, which are all incorporated herein by this reference. The inventive concept may be advantageously applied to such alternative FTIR systems as well.

2. Transmission

As indicated in FIG. 3A, the light will not be blocked by the touching object 7. Thus, if two objects 7 happen to be placed after each other along a light path from an emitter 2 to a sensor 3, part of the light will interact with both objects 7. Provided that the light energy is sufficient, a remainder of the light will reach the sensor 3 and generate an output signal that allows both interactions (touch points) to be identified. Thus, in multi-touch FTIR systems, the transmitted light may carry information about a plurality of touches.

In the following, $T_j$ is the transmission for the j:th detection line, $T_v$ is the trans-mission at a specific position along the detection line, and $A_v$ is the relative attenuation at the same point. The total transmission (modeled) along a detection line is thus:

$$T_j = \prod_v T_v = \prod_v (1 - A_v)$$

The above equation is suitable for analyzing the attenuation caused by discrete objects on the touch surface, when the points are fairly large and separated by a distance. However, a more correct definition of attenuation through an attenuating medium may be used:

$$I_j = I_{0,j} \cdot e^{-\int a(x)dx} \rightarrow T_j = I_j / I_{0,j} = e^{-\int a(x)dx}$$

In this formulation, $I_j$ represents the transmitted energy on detection line $D_j$ with attenuating object(s), $I_{0,j}$ represents the transmitted energy on detection line $D_j$ without attenuating objects, and a(x) is the attenuation coefficient along the detection line $D_j$. We also let the detection line interact with the touch surface along the entire extent of the detection line, i.e. the detection line is represented as a mathematical line.

To facilitate the tomographic reconstruction as described in the following, the measurement values may be divided by a respective background value. By proper choice of background values, the measurement values are thereby converted into transmission values, which thus represent the fraction of the available light energy that has been measured on each of the detection lines.

The theory of the Radon transform (see below) deals with line integrals, and it may therefore be proper to use the logarithm of the above expression:

$$\log(T) = \log(e^{-\int a(x)dx}) = -\int a(x)dx$$

3. Reconstruction and Touch Data Extraction

FIG. 4A illustrates an embodiment of a method for reconstruction and touch data extraction in an FTIR system. The method involves a sequence of steps 40-48 that are repeatedly executed, typically by the signal processor 10 (FIGS. 1 and 3). In the context of this description, each sequence of steps 40-48 is denoted a sensing instance.

Each sensing instance starts by a data collection step 40, in which measurement values are sampled from the light sensors 3 in the FTIR system, typically by sampling a value from each of the aforesaid sub-signals. The data collection results in one projection value for each detection line. It may be noted that the data may, but need not, be collected for all available detection lines in the FTIR system. The data collection step 40 may also include pre-processing of the measurement values, e.g. filtering for noise reduction, conversion of measurement values into transmission values (or equivalently, attenuation values), conversion into logarithmic values, etc.

In a re-calculation step 42, the set of projection values are processed for generation of an updated set of projection values that represent fictitious detection lines with a location on the touch surface that matches a standard geometry for tomographic reconstruction. This step typically involves an interpolation among the projection values as located in a 2D sample space which is defined by two dimensions that represent the unique location of the detection lines on the touch surface. In this context, a "location" refers to the physical extent of the detection line on the touch surface as seen in a plan view. The re-calculation step 42 will be further explained and motivated in Chapter 6 below.

In a filtering step 44, the updated set of projection values is subjected to a filtering aiming at increasing high spatial frequencies in relation to low spatial frequencies amongst the set of projection values. Thus, step 44 results in a filtered version of the updated set of projection values, denoted "filtered set" in the following. Typically, step 44 involves applying a suitable 1D filter kernel to the updated set of projection values. The use of filter kernels will be further explained and motivated in Chapter 4 below. In certain embodiments, it may be advantageous to apply a low-pass filter to the updated set of projection values before applying the 1D filter kernel.

In a reconstruction step 46, an "attenuation field" across the touch surface is reconstructed by processing the filtered set in the 2D sample space. The attenuation field is a distribution of attenuation values across the touch surface (or a relevant part of the touch surface), i.e. an energy-related parameter. As used herein, "the attenuation field" and "attenuation values" may be given in terms of an absolute measure, such as light energy, or a relative measure, such as relative attenuation (e.g. the above-mentioned attenuation coefficient) or relative transmission. Step 46 may involve applying a back projection operator to the filtered set of projection values in the 2D sample space. Such an operator typically generates an individual attenuation value by calculating some form of weighted sum of selected projection values included the filtered set. The use of a back projection operator will be further explained and motivated in Chapters 4 and 5 below.

The attenuation field may be reconstructed within one or more subareas of the touch surface. The subareas may be identified by analyzing intersections of detection lines across the touch surface, based on the above-mentioned projection signals. Such a technique for identifying subareas is further disclosed in Applicant's U.S. provisional patent application No. 61/272,665, which was filed on Oct. 19, 2009 and which is incorporated herein by this reference.

In a subsequent extraction step 48, the reconstructed attenuation field is processed for identification of touch-related features and extraction of touch data. Any known technique may be used for isolating true (actual) touch points within the attenuation field. For example, ordinary blob detection and tracking techniques may be used for finding the actual touch points. In one embodiment, a threshold is first applied to the attenuation field, to remove noise. Any areas with attenuation values that exceed the threshold, may be further processed to find the center and shape by fitting for instance a two-dimensional second-order polynomial or a Gaussian bell shape to the attenuation values, or by finding the ellipse of inertia of the attenuation values. There are also numerous other techniques as is well known in the art, such as clustering algorithms, edge detection algorithms, etc.

Any available touch data may be extracted, including but not limited to x,y coordinates, areas, shapes and/or pressure of the touch points.

After step 48, the extracted touch data is output, and the process returns to the data collection step 40.

It is to be understood that one or more of steps 40-48 may be effected concurrently. For example, the data collection step 40 of a subsequent sensing instance may be initiated concurrently with any of steps 42-48. In can also be noted that the recalculation and filtering steps 42, 44 can be merged into one single step, since these steps generally involve linear operations.

The touch data extraction process is typically executed by a data processing device (cf. signal processor 10 in FIGS. 1 and 3) which is connected to sample the measurement values from the light sensors 3 in the FTIR system. FIG. 4B shows an example of such a data processing device 10 for executing the process in FIG. 4A. In the illustrated example, the device 10 includes an input 400 for receiving the output signal. The device 10 further includes a data collection element (or means) 402 for processing the output signal to generate the above-mentioned set of projection values, and a recalculation element (or means) 404 for generating the above-mentioned updated set of projection values. There is also provided a filtering element (or means) 406 for generating the above-mentioned filtered set. The device 10 further includes a reconstruction element (or means) 408 for generating the reconstructed attenuation field by processing the filtered set, and an output 410 for outputting the reconstructed attenuation field. In the example of FIG. 4B, the actual extraction of touch data is carried out by a separate device 10' which is connected to receive the attenuation field from the data processing device 10.

The data processing device 10 may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit serves as one element/means when executing one instruction, but serves as another element/means when executing another instruction. In addition, one element/means may be implemented by one instruction in some cases, but by a plurality of instructions in some other cases. Such a software controlled computing device may include one or more processing units, e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The data processing device 10 may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The data processing device 10 may include one or more communication interfaces, such as a serial interface, a parallel interface, a USB interface, a wireless interface, a network adapter, etc, as well as one or more data acquisition devices, such as an A/D converter. The special-purpose software may be provided to the data processing device 10 on any suitable computer-readable medium, including a record medium, a read-only memory, or an electrical carrier signal.

4. Tomographic Techniques

Tomographic reconstruction, which is well-known per se, may be based on the mathematics describing the Radon transform and its inverse. The following theoretical discussion is limited to the 2D Radon transform. The general concept of tomography is to do imaging of a medium by measuring line integrals through the medium for a large set of angles and positions. The line integrals are measured through the image plane. To find the inverse, i.e. the original image, many algorithms use the so-called Projection-Slice Theorem.

Several efficient algorithms have been developed for tomographic reconstruction, e.g. Filtered Back Projection (FBP), FFT-based algorithms, ART (Algebraic Reconstruction Technique), SART (Simultaneous Algebraic Reconstruction Technique), etc. Filtered Back Projection is a widely used algorithm, and there are many variants and extensions thereof. Below, a brief outline of the underlying mathematics for FBP is given, for the sole purpose of facilitating the following discussion about the inventive concept and its merits.

4.1 Projection-Slice Theorem

Many tomographic reconstruction techniques make use of a mathematical theorem called Projection-Slice Theorem. This Theorem states that given a two-dimensional function $f(x, y)$, the one- and two-dimensional Fourier transforms $\mathcal{F}_1$ and $\mathcal{F}_2$, a projection operator $\mathcal{R}$ that projects a two-dimensional (2D) function onto a one-dimensional (1D) line, and a slice operator $S_1$ that extracts a central slice of a function, the following calculations are equal:

$$\mathcal{F}_1 \mathcal{R} f(x,y) = S_1 \mathcal{F}_2 f(x,y)$$

Figure 5:
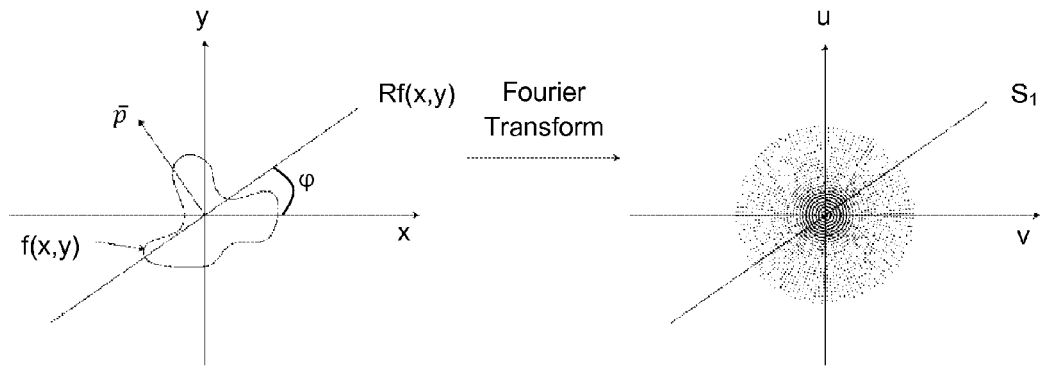
FIG. 5 illustrates the underlying principle of the Projection-Slice Theorem.

This relation is illustrated in FIG. 5. The right-hand side of the equation above essentially extracts a 1D line of the 2D Fourier transform of the function $f(x, y)$. The line passes through the origin of the 2D Fourier plane, as shown in the right-hand part of FIG. 5. The left-hand side of the equation starts by projecting (i.e. integrating along 1D lines in the projection direction $\bar{p}$) the 2D function onto a 1D line (orthogonal to the projection direction $\bar{p}$), which forms a "projection" that is made up of the projection values for all the different detection lines extending in the projection direction $\bar{p}$. Thus, taking a 1D Fourier transform of the projection gives the same result as taking a slice from the 2D Fourier transform of the function $f(x, y)$. In the context of the present disclosure, the function $f(x, y)$ corresponds to the attenuation coefficient field $a(x)$ (generally denoted "attenuation field" herein) to be reconstructed.

4.2 Radon Transform

First, it can be noted that the attenuation vanishes outside the touch surface. For the following mathematical discussion, we define a circular disc that circumscribes the touch surface, $\Omega_r = \{x: |x| \leq r\}$, with the attenuation field set to zero outside of this disc. Further, the projection value for a given detection line is given by:

$$g(\theta, s) = (\mathcal{R}a)(\theta, s) = \int_{s=x\cdot\theta} a(x)dx$$

Here, we let $\theta=(\cos \phi, \sin \phi)$ be a unit vector denoting the direction normal to the detection line, and s is the shortest distance (with sign) from the detection line to the origin (taken as the centre of the screen, cf. FIG. 5).). Note that $\theta$ is perpendicular to the above-mentioned projection direction vector, $\bar{p}$. This means that we can denote g $(\theta, s)$ by $g(\phi, s)$ since the latter notation more clearly indicates that g is a function of two variables and not a function of one scalar and one arbitrary vector. Thus, the projection value for a detection line could be expressed as $g(\phi, s)$, i.e. as a function of the angle of the detection line to a reference direction, and the distance of the detection line to an origin. We let the angle span the range $0 \leq \phi < \pi$, and since the attenuation field has support in $\Omega_r$, it is sufficient to consider s in the interval $-r \leq s \leq r$. The set of projections collected for different angles and distances may be stacked together to form a "sinogram".

Our goal is now to reconstruct the attenuation field $a(x)$ given the measured Radon transform, $g = \mathcal{R} a$. The Radon transform operator is not invertible in the general sense. To be able to find a stable inverse, we need to impose restrictions on the variations of the attenuation field.

One should note that the Radon transform is the same as the above-mentioned projection operator in the Projection-Slice Theorem. Hence, taking the 1D Fourier transform of $g(\phi, s)$ with respect to the s variable results in central slices from the 2D Fourier transform of the attenuation field $a(x)$.

4.3 Continuous vs. Discrete Tomography

The foregoing sections 4.1-4.2 describe the mathematics behind tomographic reconstruction using continuous functions and operators. However, in a real world system, the measurement data represents a discrete sampling of functions, which calls for modifications of the algorithms. For a thorough description of such modifications, we refer to the mathematical literature, e.g. "The Mathematics of Computerized Tomography" by Natterer, and "Principles of Computerized Tomographic Imaging" by Kak and Slaney.

One important modification is a need for a filtering step when operating on discretely sampled functions. The need for filtering can intuitively be understood by considering the Projection-Slice Theorem in a system with discrete sampling points and angles, i.e. a finite set of detection lines. According to this Theorem, for each angle $\phi$, we take the 1D discrete Fourier transform of $g(\phi, s)$ with respect to the s variable and put the result into the Fourier plane as slices through the origin of the 2D Fourier transform of the original function $a(x)$. This is illustrated in the left-hand part of FIG. 6 for a single projection. When we add information from several different projections, the density of sampling points will be much higher near the origin of the 2D Fourier transform plane. Since the information density is much higher at low frequencies, an unfiltered back projection will yield a blurring from the low frequency components.

To compensate for the non-uniform distribution of sampling points in the 2D Fourier transform plane, we may increase the amount of information about the high spatial frequencies. This can be achieved by filtering, which can be expressed as a multiplication/weighting of the data points in the 2D Fourier transform plane. This is exemplified in the right-hand part of FIG. 6, where the amplitude of the high spatial frequencies are increased and the amplitude of the low frequency components is decreased. This multiplication in the 2D Fourier transform plane can alternatively be expressed as a convolution in the spatial domain, i.e. with respect to the s variable, using the inverse Fourier transform of the weighting function. The multiplication/weighting function in the 2D Fourier transform plane is rotationally symmetric. Thus, we can make use of the Projection-Slice Theorem to get the corresponding 1D convolution kernel in the projection domain, i.e. the kernel we should use on the projections gathered at specific angles. This also means that the convolution kernel will be the same for all projection angles.

4.4 Filtering and Back Projection

As explained in the foregoing section, the sinogram data is first filtered and then back-projected. The filtering can be done by multiplication with a filter $W_b$ in the Fourier domain. There are also efficient ways of implementing the filtering as a convolution by a filter $W_b$ in the spatial domain. In one embodiment, the filtering is done on the s parameter only, and may be described by the following expression:

$$(W_b * f)(x) = \mathcal{R}^{\#}(w_b(s) * g(\theta,s)) = \mathcal{R}^{\#} v,$$

where $\mathcal{R}^{\#}$ is a back projection operator defined as:

$$(\mathcal{R}^{\#} v)(x) = 2\int_0^\pi v(\theta, x \cdot \theta)\, d\varphi,$$

and $W_b(x) \equiv \mathcal{R}^{\#} w_b$. The idea is to choose the $w_b(s)$-filter such that $W_b(X) \cong \delta(x)$. This is typically accomplished by working in the Fourier domain, taking $\widehat{W_b}(\xi)$ as a step function supported in a circular disc of radius b, and letting $b \to \infty$. The corresponding filter in the spatial domain is $$w_b(s) = \left(\frac{b}{2\pi}\right)^2 \left(\text{sinc}(bs) - \frac{1}{2}\left(\text{sinc}\left(\frac{bs}{2}\right)\right)^2\right),$$

with continuous extension across the singularity at s=0.

In the literature, several variants of the filter can be found, e.g. Ram-Lak, Shepp-Logan, Cosine, Hann, and Hamming 5. Standard Geometries for Tomographic Processing Tomographic processing is generally based on standard geometries. This means that the mathematical algorithms presume a specific geometric arrangement of the detection lines in order to attain a desired precision and/or processing efficiency. The geometric arrangement may be selected to enable a definition of the projection values in a 2D sample space, inter alia to enable the above-mentioned filtering in one of the dimensions of the sample space before the back projection.

In conventional tomography, the measurement system (i.e. the location of the incoupling points and/or outcoupling points) is controlled or set to yield the desired geometric arrangement of detection lines. Below follows a brief presentation of the two major standard geometries used in conventional tomography e.g. in the medical field.

5.1 Parallel Geometry

Figure 7:
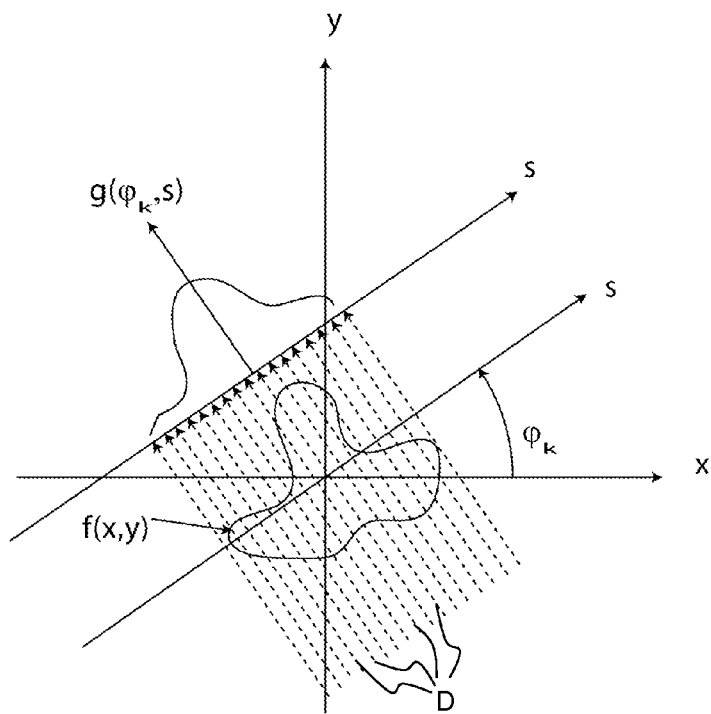
FIG. 7 illustrates a parallel geometry used in tomographic reconstruction.

The parallel geometry is exemplified in FIG. 7. Here, the system measures projection values of a set of detection lines for a given angle $\phi_k$. In FIG. 7, the set of detection lines D are indicated by dashed arrows, and the resulting projection is represented by the function $g(\phi_k, s)$. The measurement system is then rotated slightly around the origin of the x,y coordinate system in FIG. 7, to collect projection values for a new set of detection lines at this new rotation angle. As shown by the dashed arrows, all detection lines are parallel to each other for each rotation angle. The system generally measures projection values (line integrals) for angles spanning the range $0 \leq \phi < \pi$. When all the projections are collected, they can be arranged side by side in a data structure to form a sinogram. The sinogram is generally given in a 2D sample space defined by dimensions that uniquely assign each projection value to a specific detection line. In the case of a parallel geometry, the sample space is typically defined by the angle parameter $\phi$ and the distance parameter s.

Below, the use of a parallel geometry in tomographic processing is further exemplified in relation to a known attenuation field shown in FIG. 8A, in which the right-end bar indicates the coding of gray levels to attenuation strength (%). FIG. 8B is a graph of the projection values as a function of distance s for the projection obtained at $\phi=\pi/6$ in the attenuation field of FIG. 8A. FIG. 8C illustrates the sinogram formed by all projections collected from the attenuation field, where the different projections are arranged as vertical sequences of values. For reference, the projection shown in FIG. 8B is marked as a dashed line in FIG. 8C.

The filtering step, i.e. convolution, is now done with respect to the s variable, i.e. in the vertical direction in FIG. 8C. As mentioned above, there are many different filter kernels that may be used in the filtering. FIG. 8D illustrates the central part of a discrete filter kernel $w_b$ that is used in the following examples. As shown, the absolute magnitude of the filter values quickly drop off from the center of the kernel (k=0). In many practical implementations, it is possible to use only the most central parts of the filter kernel, thereby decreasing the number of processing operations in the filtering step.

Since the filtering step is a convolution, it may be computationally more efficient to perform the filtering step in the Fourier domain. For each column of values in the $\phi$-s-plane, a discrete 1D Fast Fourier transform is computed. Then, the thus-transformed values are multiplied by the 1D Fourier transform of the filter kernel. The filtered sinogram is then obtained by taking the inverse Fourier transform of the result. This technique can reduce the complexity from $O(n^2)$ down to $O(n \cdot \log_2(n))$ of the filtering step for each $\phi$, where n is the number of sample points (projection values) with respect to the s variable.

Figures 8A, 8B:
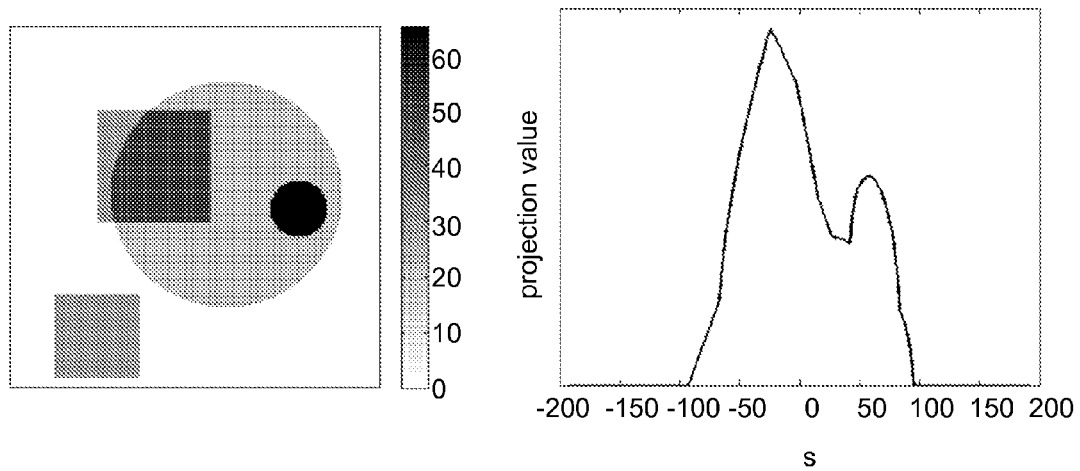
Figure 8C:
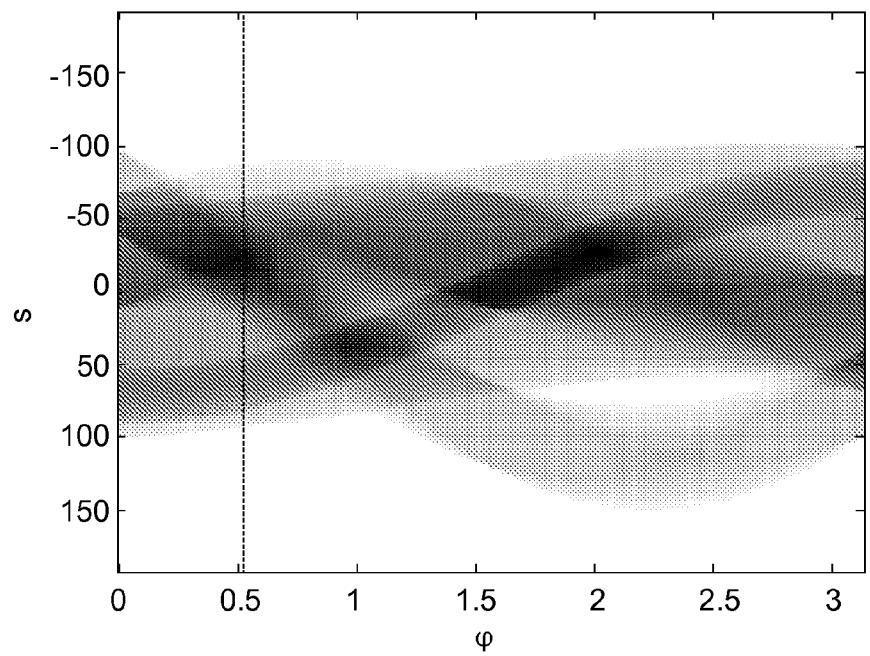
Figure 8D:
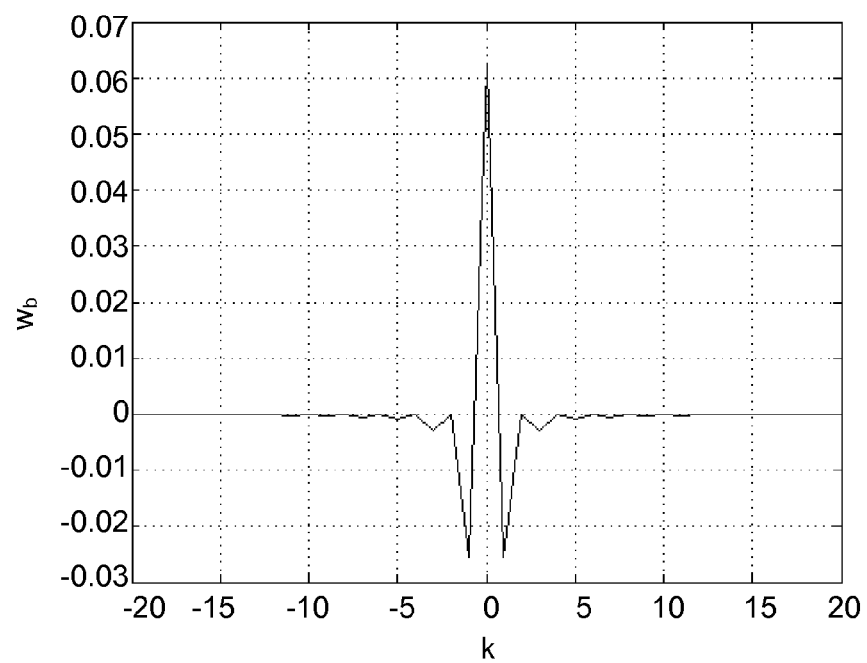
Figure 8E:
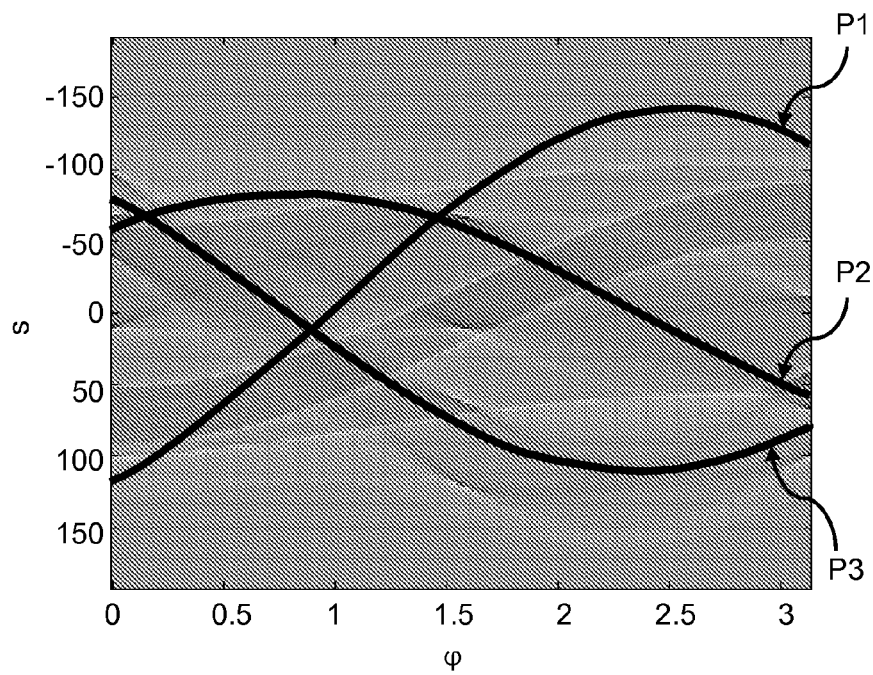

FIG. 8E shows the filtered sinogram that is obtained by operating the filter kernel in FIG. 8D on the sinogram in FIG. 8C.

The next step is to apply the back projection operator. Fundamental to the back projection operator is that a single position in the attenuation field is represented by a sine function in the sinogram. Thus, to reconstruct each individual attenuation value in the attenuation field, the back projection operator integrates the values of the filtered sinogram along the corresponding sine function. To illustrate this concept, FIG. 8E shows three sine functions P1-P3 that correspond to three different positions in the attenuation field of FIG. 8A.

Figure 8F:
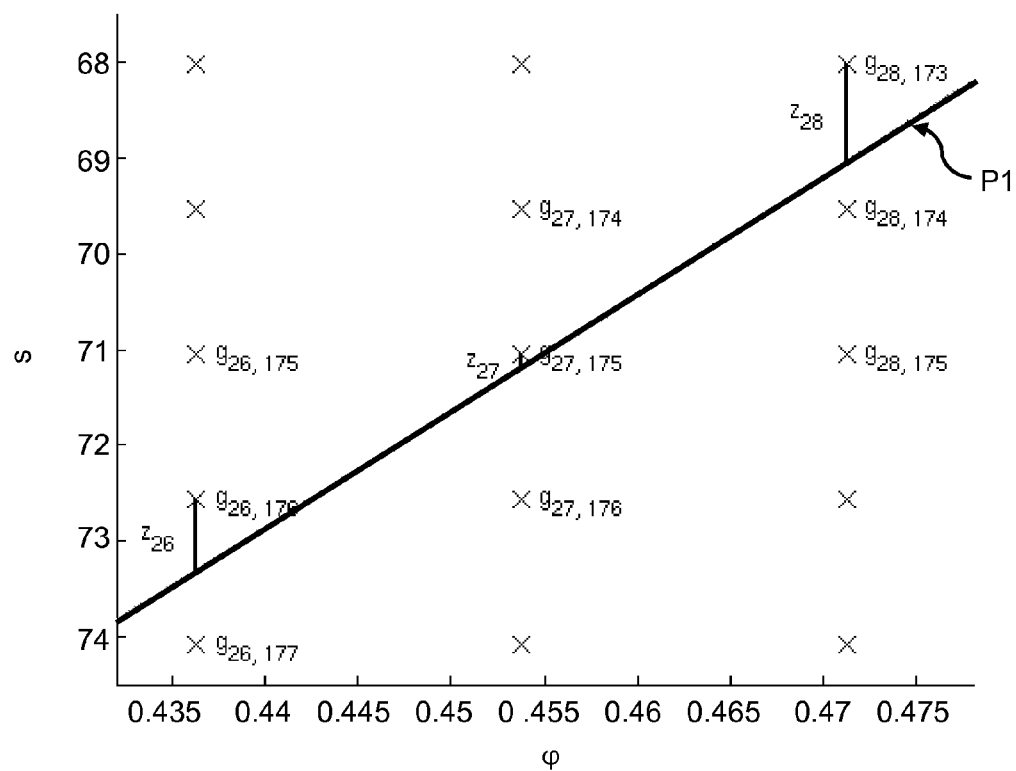

Since the location of a reconstructed attenuation value will not coincide exactly with all of the relevant detection lines, it may be necessary to perform linear interpolation with respect to the s variable where the sine curve crosses between two projection values. Another approach, which is less computationally effective, is to compute the filtered values at the crossing points by applying individual filtering kernels. The interpolation is exemplified in FIG. 8F, which is an enlarged view of FIG. 8E and in which x indicates the different filtered projection values of the filtered sinogram. The contribution to the back projection value for the sine curve P1 from the illustrated small part of the $\phi$-s-plane becomes:

$$(1-z_{26}) \cdot (w^*g)_{26,176} + z_{26} \cdot (w^*g)_{26,177} + (1-z_{27}) \cdot (w^*g)_{27,175} + z_{27} \cdot (w^*g)_{27,176} + (1-z_{28}) \cdot (w^*g)_{28,173} + z_{28} \cdot (w^*g)_{28,174}$$

The weights $z_i$ in the linear interpolation is given by the normalized distance from the sine curve to the projection value, i.e. $0 \leq z_i < 1$.

FIG. 8G shows the reconstructed attenuation field that is obtained by applying the back projection operator on the filtered sinogram in FIG. 8E. It should be noted that the filtering step is important for the reconstruction to yield useful data. FIG. 8H shows the reconstructed attenuation field that is obtained when the filtering step is omitted.

5.2 Fan Geometry

Another major type of tomography arrangement is based on sampling of data from a single emitter, instead of measuring parallel projections at several different angles. This so-called fan geometry is exemplified in FIG. 9. As shown, the emitter emits rays in many directions, and sensors are placed to measure the received energy from this single emitter on a number of detection lines D, illustrated by dashed lines in FIG. 9. Thus, the measurement system collects projection values for a set of detection lines D extending from the emitter when located at angle $\beta_i$. In the illustrated example, each detection line D is defined by the angular location $\beta$ of the emitter with respect to a reference angle ($\beta = 0$ coinciding with the x-axis), and the angle $\alpha$ of the detection line D with respect to a reference line (in this example, a line going from the emitter through the origin). The measurement system is then rotated slightly ($\delta\beta$) around the origin of the x,y coordinate system in FIG. 9, to collect a new set of projection values for this new angular location. It should be noted that the rotation might not be limited to $0 \leq \beta < \pi$, but could be extended, as is well-known to the skilled person. The following example is given for a full rotation: $0 \leq \beta < 2\pi$.

Fan beam tomographs may be categorized as equiangular or equidistant. Equiangular systems collect information at the same angle (as seen from the emitter) between neighboring sensors. Equiangular systems may be configured with emitter and sensors placed on a circle, or the sensors may be non-equidistantly arranged on a line opposite to the emitter. Equidistant systems collect information at the same distance between neighboring sensors. Equidistant systems may be configured with sensors placed on a line opposite to the emitter. The following example is given for an equiangular system, and based on the known attenuation field shown in FIG. 8A. For a thorough description of the different types of fan (beam) geometries, we refer to the literature.

Figure 10A:
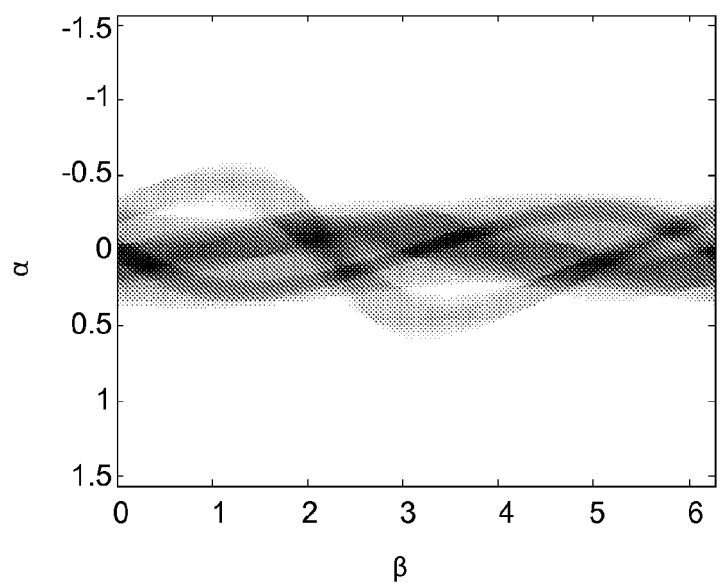
FIGS. 10A-10C illustrate intermediate and final results of a back projection process using a fan geometry.

FIG. 10A illustrates the sinogram formed by all projections collected from the attenuation field in FIG. 8A, by the measurement system outlined in FIG. 9. In FIG. 10A, the different projections are arranged as vertical sequences of values. It could be noted that the sinogram is given in a 2D sample space defined by the angular emitter location parameter $\beta$ and the angular direction parameter $\alpha$.

In an exemplifying tomographic processing of the sinogram in FIG. 10A, an angle correction is first applied on all collected projections according to:

$$g'(\alpha_k, \beta_i) = \pi \cdot g(\alpha_k, \beta_i) \cdot \cos(\alpha_k).$$

The filtering step, i.e. convolution, is now done with respect to the $\alpha_k$ variable of the angle-corrected sinogram, i.e. corresponding to the vertical direction in the angle-corrected sinogram. As mentioned above, there are many different filter kernels that may be used in the filtering. The following example uses a filter kernel similar to the one shown in FIG. 8C. For example, many symmetric high-pass filters with a coefficient sum equal to zero may enable adequate reconstruction of the attenuation field. However, a careful choice of filter may be needed in order to reduce reconstruction artifacts. The result may also be improved by applying a smoothing filter in this step, as is well-known in the art. Like in the parallel geometry, the filtering may involve a convolution in the spatial domain or a multiplication in the Fourier domain.

Figure 10B:
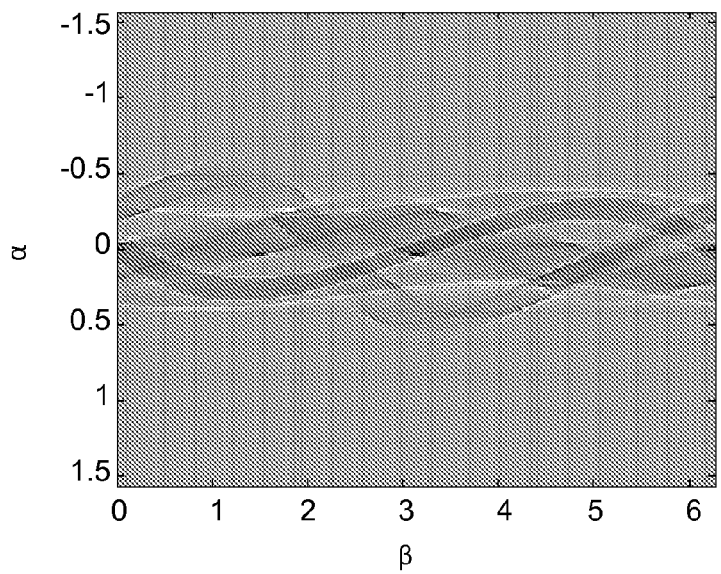

The filtered sinogram obtained by operating the filter kernel on the angle-corrected sinogram is shown in FIG. 10B.

The next step is to apply the back projection operator. The back projection operator is different from the one used in the above-described parallel geometry. In the fan geometry, the back projection step may be given by the expression:

$$(\mathcal{R}^\# v)(x) = \delta\beta \sum_{\beta_i} \frac{1}{\|x - D_i\|^2}((1-z) \cdot v(\alpha_k, \beta_i) + z \cdot v(\alpha_{k+1}, \beta_i)),$$

where $D_i$ is the position of the source giving the $\beta_i$ projection, z is a parameter that describes the linear interpolation between the detection lines and a ray that extends from the source through the location of the respective attenuation value to be reconstructed.

Figure 10C:
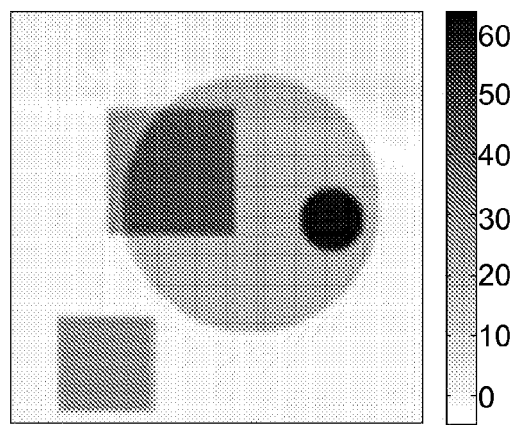

FIG. 10C shows the reconstructed attenuation field that is obtained by applying the back projection operator on the filtered sinogram in FIG. 10B.

5.3 Re-Sorting Algorithms

Another approach to do the filtered back projection for a fan geometry is to choose the locations of emitters and sensors such that it is possible to re-sort the data into a parallel geometry. Generally, such re-sorting algorithms are designed to achieve regularly spaced data samples in the $\phi$-s-plane. More information about re-sorting algorithms is e.g. found in "Principles of Computerized Tomographic Imaging" by Kak and Slaney.

Figure 11:
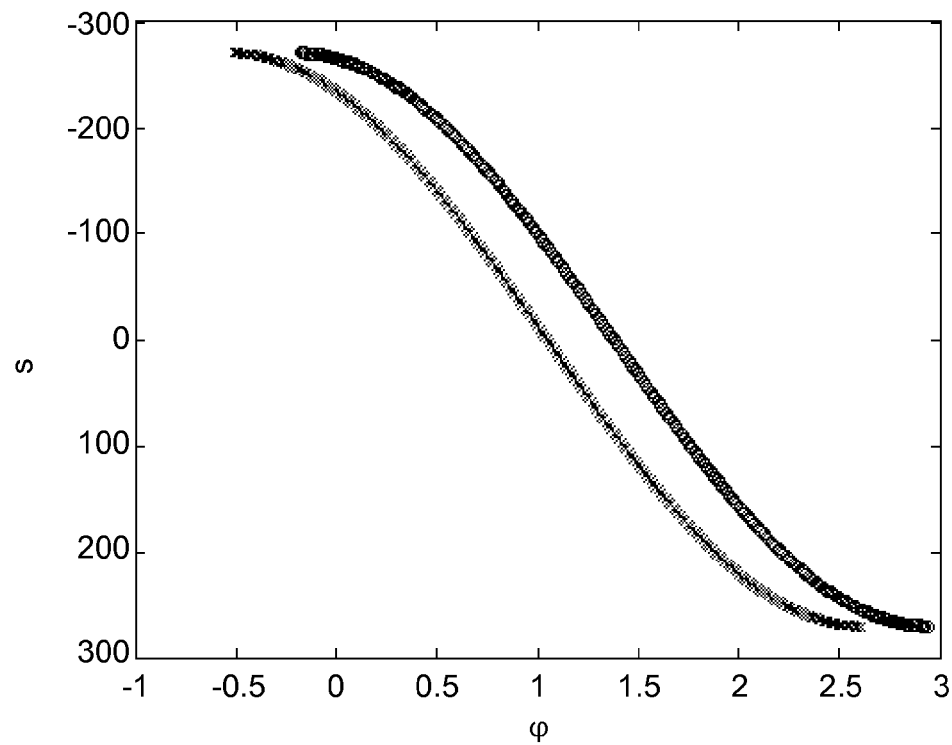
FIG. 11 is graph of projection values collected in the fan geometry of FIG. 9 mapped to a sampling space for a parallel geometry.

To further explain the concept of re-sorting, FIG. 11 shows the data samples (projection values) collected from two different emitters (i.e. two different values of $\beta$) in an equiangular fan beam tomograph. The data samples are mapped to a $\phi$-s-plane. It can be noted that the projection values obtained from a single emitter do not show up as a straight vertical line with respect to the s variable. It can also be seen that the $\phi$ values differ only by a constant, and that the s values are identical for the two different projections. One re-sorting approach is thus to collect projection values that originate from detection lines with the same $\phi$ values (i.e. from different emitters) and let these constitute a column in the $\phi$-s-plane. However, this leads to a non-uniform spacing of the s values, which may be overcome by interpolating (re-sampling) the projection values with respect to the s variable. It should be noted that this procedure is a strictly 1D interpolation and that all columns undergo the same transform. It should also be noted that this procedure transforms one standard tomography geometry into another standard tomography geometry.

In order for the re-sorting algorithms to work, it is essential (as stated in the literature) that $\delta\beta = \delta\alpha$, i.e. the angular rotation between two emitter locations is the same as the angular separation between two detection lines. Only when this requirement is fulfilled, the projection values will form columns with respect to the s variable.

6. Use of Tomographic Processing for Touch Determination

Figure 12A:
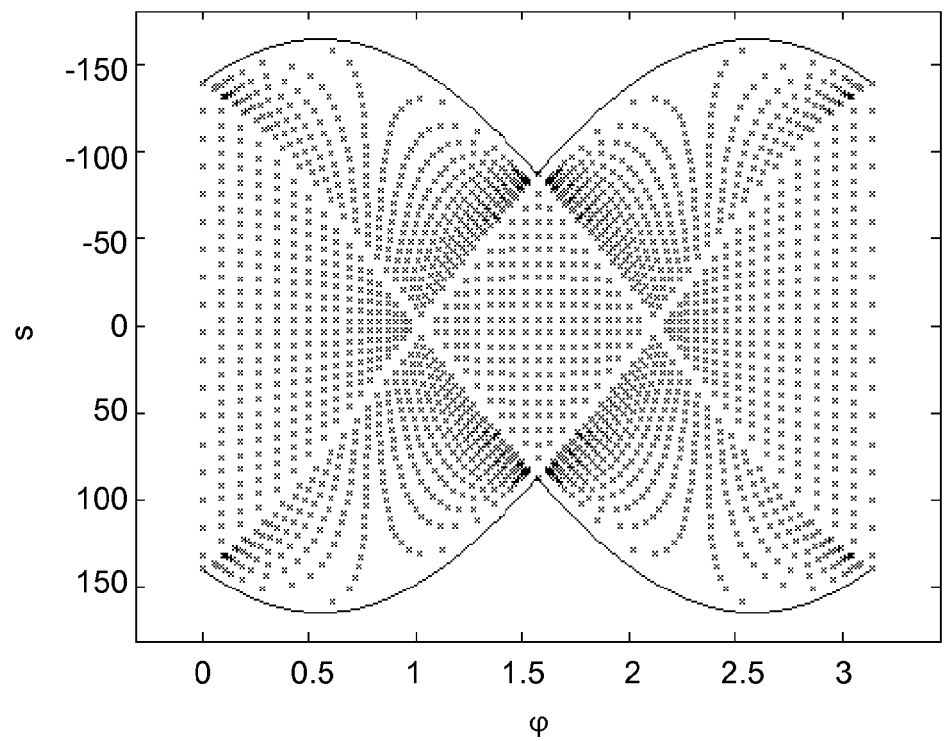
FIG. 12A is a graph of sampling points defined by interleaved arrangement in FIG. 2A, FIGS. 12B-12C illustrate discrepancies between detection lines in an interleaved arrangement and a fan geometry.

FIG. 12A illustrates the sampling points (corresponding to detection lines, and thus to measured projection values) in the $\phi$-s-plane for the interleaved system shown in FIG. 2A. Due to the irregularity of the sampling points, it is difficult to apply the above-described filter. The irregularity of the sampling points also makes it difficult to apply a re-sorting algorithm.

In FIG. 12A, the solid lines indicate the physical limits of the touch surface. It can be noted that the angle $\phi$ actually spans the range from 0 to $2\pi$, since the incoupling and outcoupling points extend around the entire perimeter. However, a detection line is the same when rotated by $\pi$, and the projection values can thus be rearranged to fall within the range of 0 to $\pi$. This rearrangement is optional; the data processing can be done in the full range of angles with a correction of some constants in the back projection function.

Figure 12B:
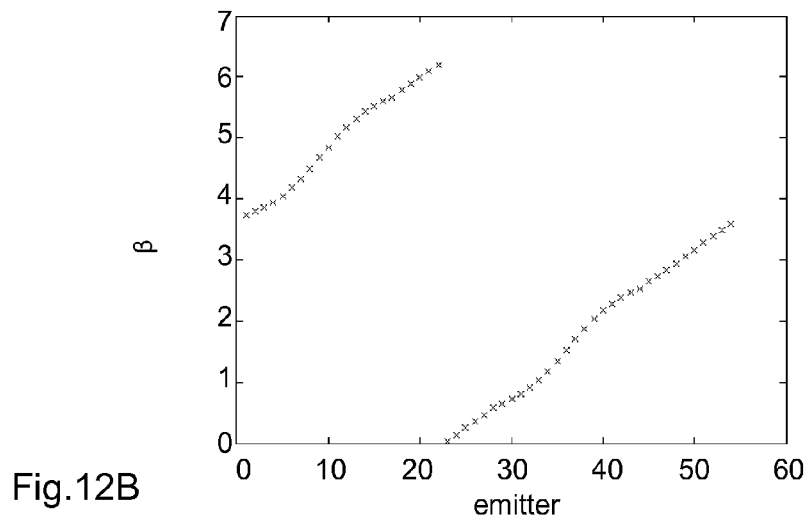
FIG. 12D is a graph of sampling points for the non-interleaved arrangement in FIG. 2B.
Figure 12C:
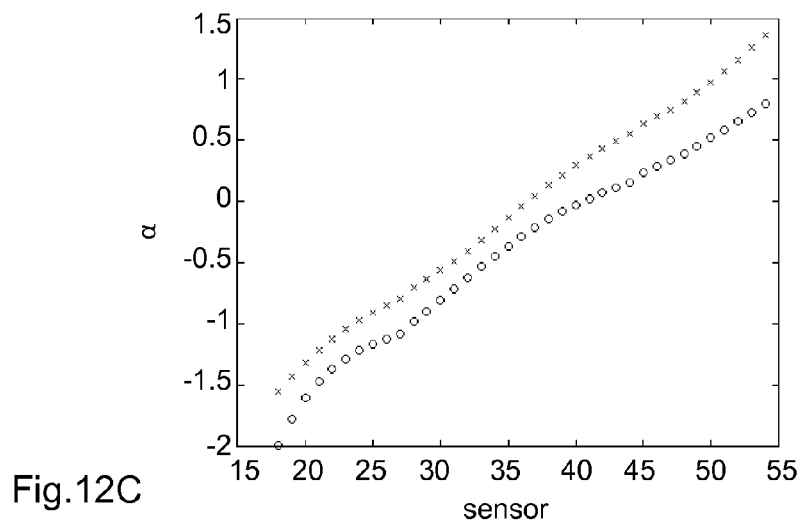

When comparing the interleaved arrangement in FIG. 2A with the fan geometry in FIG. 9, we see that the angular locations $\beta_i$ are not equally spaced, and that angular directions $\alpha$ are neither equiangular nor equidistant. Also, the values attained by $\alpha$ are different for different $\beta_i$. The different $\beta_i$ values for the interleaved arrangement are shown in FIG. 12B. In an ideal fan beam tomograph, this plot would be a straight line. The step change at emitter 23 is caused by the numbering of the emitters (in this example, the emitters are numbered counter-clockwise starting from the lower-left corner in FIG. 2A). FIG. 12C exemplifies the variation in $\alpha$ values for emitter 10 (marked with crosses) and emitter 14 (marked with circles) in FIG. 2A. In an ideal equiangular fan beam tomograph, this plot would result in two straight lines, with a separation in the vertical direction arising from the numbering of the sensors. Instead, FIG. 12C shows a lack of regularity for both the individual emitter and between different emitters. Another aspect is that the fan geometry assumes that the source is positioned, for all projections, at the same distance from the origin, which is not true for an interleaved arrangement around a non-circular touch surface.

Figure 12D:
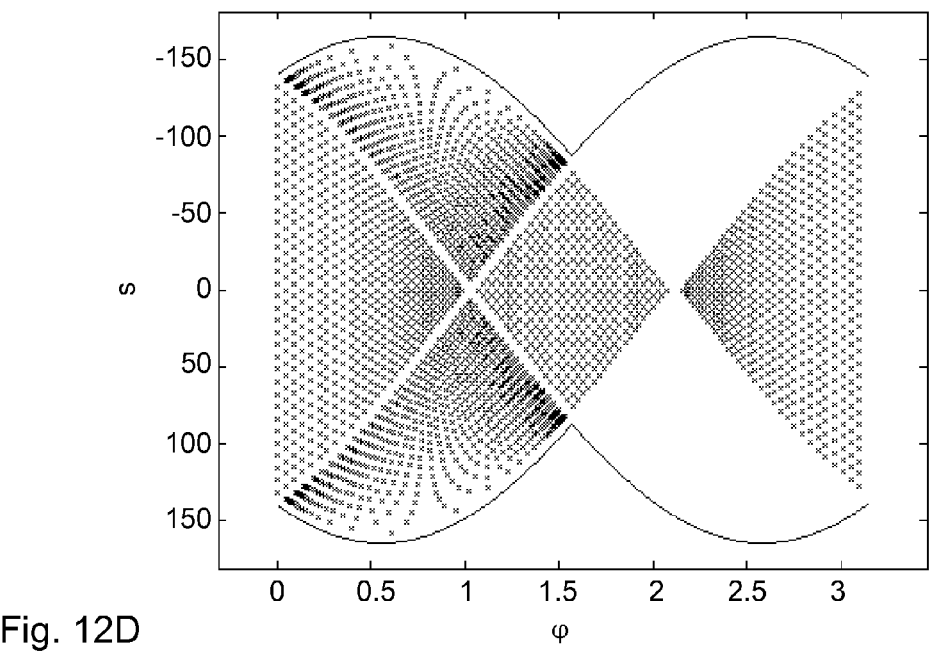

FIG. 12D illustrates the sampling points in the $\phi$-s-plane for the non-interleaved system shown in FIG. 2B. Apart from the irregularity of sampling points, there are also large portions of the $\phi$-s-plane that lack sampling points due to the non-interleaved arrangement of incoupling and outcoupling points.

Thus, it is not viable to apply a filter directly on the sampling points mapped to a sample space such as the $\phi$-s-plane or the $\beta$-$\alpha$-plane, and the sampling points cannot be re-sorted to match any standard tomography geometry. This problem is overcome by the re-calculation step (42 in FIG. 4A), which processes the projection values of the sampling points for generation of projection values for an updated set of sampling points. The updated set of sampling points represent a corresponding set of fictitious detection lines. These fictitious detection lines have a location on the touch surface that matches a standard geometry, typically the parallel geometry or the fan geometry. The generation of projection values of an updated set of sampling points may be achieved by interpolating the original sampling points.

The objective of the interpolation is to find an interpolation function that can produce interpolated values at specific interpolation points in the sample space given a set of measured projection values at the original sampling points. The interpolation points, possibly together with part of the original sampling points, form the above-mentioned updated set of sampling points. This updated set of sampling points is generated to be located in accordance with, for instance, the parallel geometry or the fan geometry. The density of the updated set of sampling points is preferably similar to the average density of the original sampling points in the sample space.

Many different interpolating functions can be used for this purpose, i.e. to interpolate data points on a two-dimensional grid. Input to such an interpolation function is the original sampling points in the sample space as well as the measured projection value for each original sampling point. Most interpolating functions involve applying a linear operator on the measured projection values. The coefficients in the linear operator are given by the known locations of the original sampling points and the interpolation points in the sample space. The linear operator may be pre-computed and then applied on the measured projection values in each sensing instance (cf. iteration of steps 40-48 in FIG. 4A). Some non-limiting examples of suitable interpolation functions include Delaunay triangulation, and other types of interpolation using triangle grids, bicubic interpolation, e.g. using spline curves or Bezier surfaces, Sinc/Lanczos filtering, nearest-neighbor interpolation, and weighted average interpolation. Alternatively, the interpolation function may be based on Fourier transformation(s) of the measured projection values.

Below, the use of different interpolation functions in the re-calculation step (step 42 in FIG. 4A) will be further exemplified. Sections 6.1 and 6.2 exemplify the use of Delaunay triangulation, section 6.3 exemplifies the use of Fourier transformation techniques, and section 6.4 exemplifies the use of weighted average interpolation.

In the examples that are based on Delaunay triangulation, the sampling points are placed at the corners of a mesh of non-overlapping triangles. The values of the interpolation points are linearly interpolated in the triangles. The triangles can be computed using the well-known Delaunay algorithm. To achieve triangles with reduced skewness, it is usually necessary to rescale the dimensions of the sample space ($\phi$, s and $\beta$, $\alpha$, respectively) to the essentially same length, before applying the Delaunay triangulation algorithm.

In all of the following examples, the interpolation function is able to produce output values for any given position in the sample space. However, the frequency information in the updated set of sampling points will be limited according to the density of original sampling points in the sample space. Thus, wherever the original density is high, the updated set of sampling points can mimic high frequencies present in the sampled data. Wherever the original density is low, as well as if there are large gaps in the sample space, the updated set will only be able to produce low frequency variations. Non-interleaved arrangements (see FIG. 2B), will produce a sample space with one or more contiguous regions (also denoted "gap regions") that lack sampling points (see FIG. 12D). These gap regions may be left as they are, or be populated by interpolation points, or may be handled otherwise, as will be explained below in relation to a number of examples.

The following examples will illustrate re-calculation of sampling points into a parallel geometry and a fan geometry, respectively. Each example is based on a numerical simulation, starting from a reference image that represents a known attenuation field on the touch surface. Based on this known attenuation field, the projection values for all detection lines have been estimated and then used in a tomographic reconstruction according to steps 40-46 in FIG. 4A, to produce a reconstructed attenuation field. Thus, the estimated projection values are used as "measured projection values" in the following examples.

In the examples, two different merit values are used for comparing the quality of the reconstructed attenuation fields for different embodiments. The first merit value $m_1$ is defined as:

$$m_1 = \frac{\sum f}{\sum |f - f^\#|},$$

where $f$ is a reference image (i.e. the known attenuation field) and $f^\#$ is the reconstructed attenuation field. The first merit value intends to capture the similarity between the original image and the reconstructed image.

The second merit value $m_1$ is defined as:

$$m_2 = \frac{\sum f}{\sum_{f=0} |f - f^{\#}|},$$

i.e. the denominator only includes absolute differences in the regions where the attenuation values are zero in the reference image. The second merit value thus intends to capture the noise in the reconstructed image by analyzing the regions of the image where there should be no attenuation present.

6.1 Re-Calculation into a Parallel Geometry

The following examples will separately illustrate the re-calculation into a standard parallel geometry for an interleaved arrangement and for a non-interleaved arrangement. Since the re-calculation is made for a parallel geometry, the following examples are given for processing in the $\phi$-s-plane.

6.1.1 Example: Interleaved Arrangement

Figure 13:
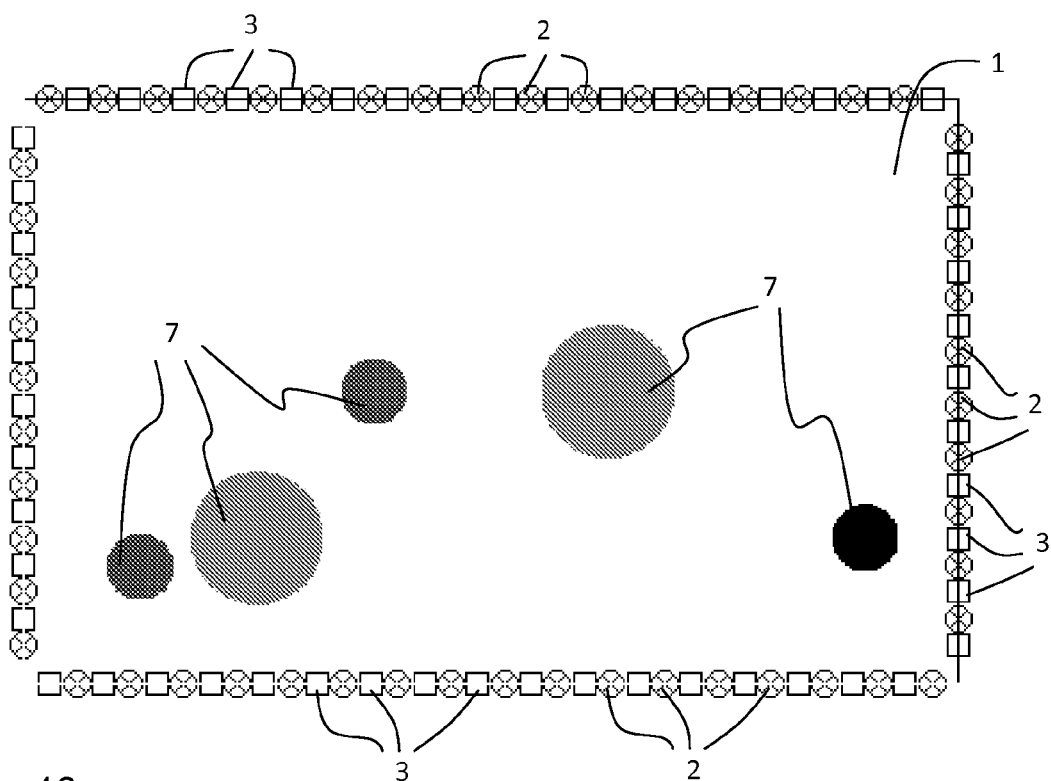
FIG. 13 is a reference image mapped to an interleaved arrangement.

This example is given for the interleaved arrangement shown in FIG. 2A, assuming the reference image shown in FIG. 13. The reference image is thus formed by five touching objects 7 of different size and attenuation strength that are distributed on the touch surface 1. For reasons of clarity, FIG. 13 also shows the emitters 2 and sensors 3 in relation to the reference image.

Figure 14A:
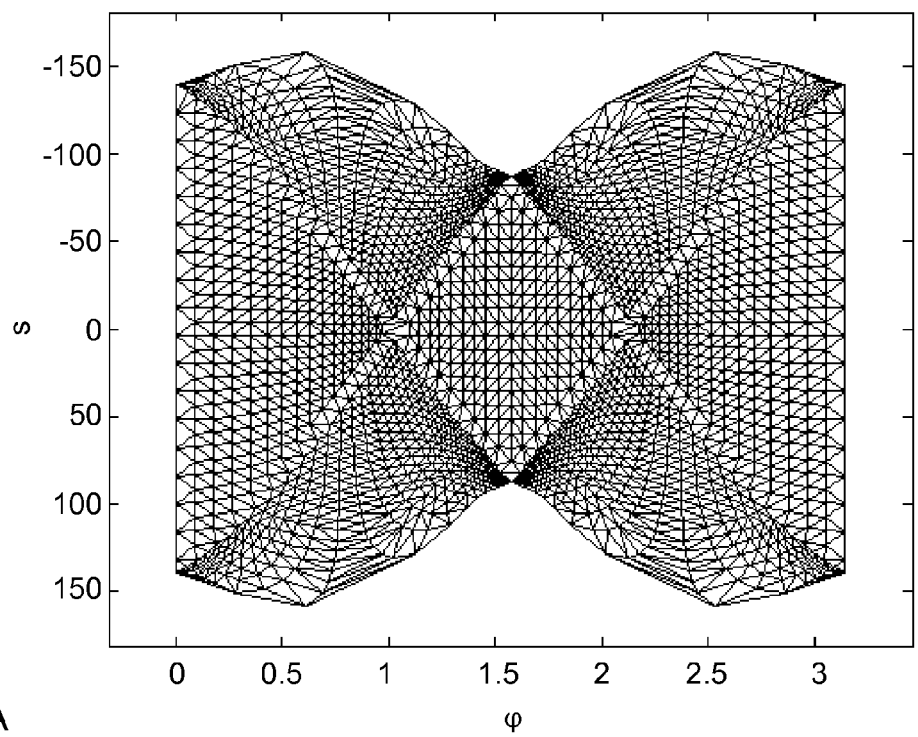
FIG. 14A is a graph of a 2D interpolation function for an interleaved arrangement.
Figure 14B:
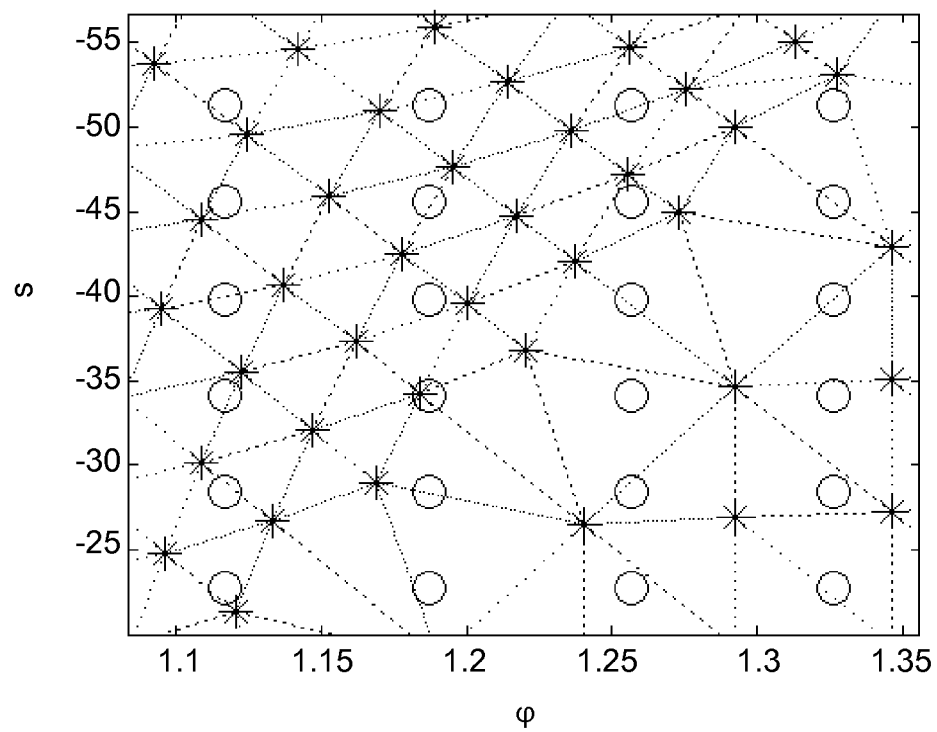
FIG. 14B illustrates the generation of interpolation points using the interpolation function of FIG. 14A.

FIG. 14A is a plan view of the resulting sample space, where a mesh of non-overlapping triangles have been adapted to the sampling points so as to provide a two-dimensional interpolation function. FIG. 14B is a close-up of FIG. 14A to illustrate the sampling points (stars) and the Delaunay triangulation (dotted lines extending between the sampling points). FIG. 14B also illustrates the interpolation points (circles). Thus, the values of the interpolation points are calculated by operating the Delaunay triangulation on the projection values in the sampling points. In the illustrated example, the interpolation points replace the sampling points in the subsequent calculations. In other words, the sinogram formed by the measured projection values is replaced by an interpolated sinogram formed by interpolated projection values. Thereby, it is possible to obtain a uniform density of interpolation points across the sample space, if desired. Each interpolation point corresponds to a fictitious detection line that extends across the touch surface in accordance with a parallel geometry. Thus, the interpolation is designed to produce a set of fictitious detection lines that match a parallel geometry, that allows a reconstruction of the attenuation field using standard algorithms.

As shown, the interpolation points are arranged as columns (i.e. with respect to the s variable) in the sample space, allowing subsequent 1D filtering with respect to the variable. In this example, the interpolation points are arranged with equidistant spacing with respect to the s variable, which has been found to improve the reconstruction quality and facilitate the subsequent reconstruction processing, e.g. the 1D filtering. Preferably, the inter-column distance is the same for all columns since this will make the back projection integral perform better.

In the interpolated sinogram, each $\phi$ value with its associated s values (i.e. each column) corresponds to a set of mutually parallel (fictitious) detection lines, and thus the data is matched to a parallel geometry in a broad sense.

Figure 14C:
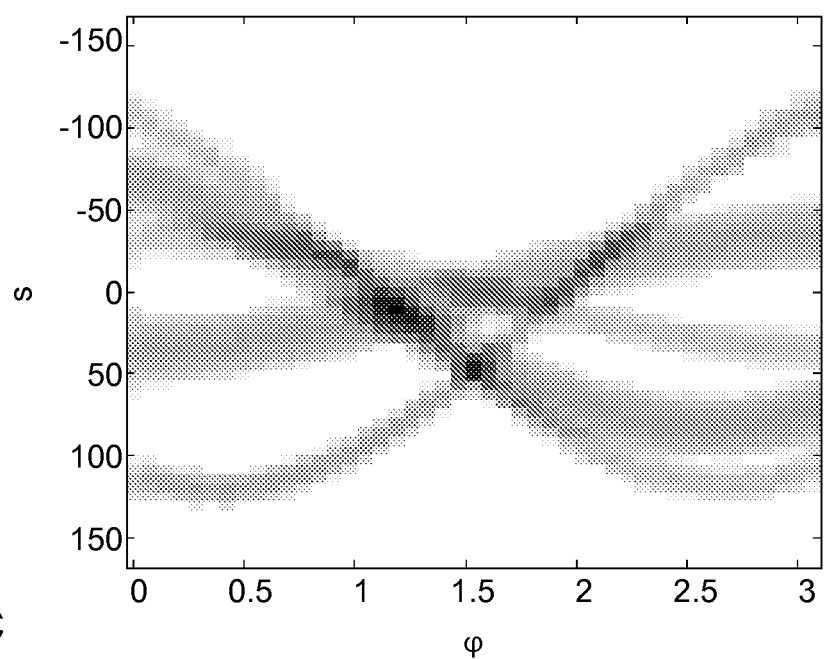
FIG. 14C is an interpolated sinogram generated based on the reference image in FIG. 13.
Figure 14D:
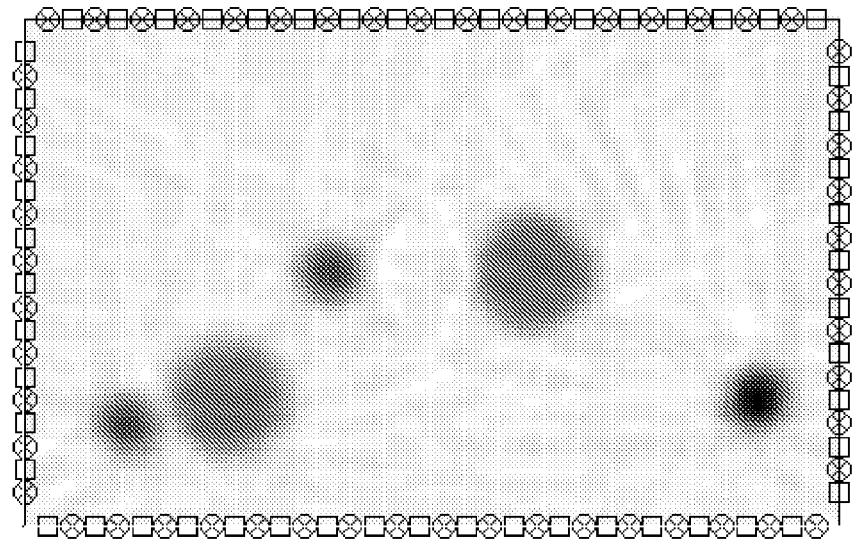
FIG. 14D is a reconstructed attenuation field.

FIG. 14C illustrates the interpolated sinogram, i.e. the interpolated projection values that has been calculated by operating the interpolation function in FIG. 14A on the measured projection values. After filtering the interpolated sinogram with respect to the s variable, using the filter in FIG. 8D, and applying the back projection operator on the thus filtered sinogram, a reconstructed attenuation field is obtained as shown in FIG. 14D, having merit values: $m_1$=1.3577 and $m_2$=3.3204.

Variants for generating the updated set of sampling points are of course possible. For example, different interpolation techniques may be used concurrently on different parts of the sample space, or certain sampling points may be retained whereas others are replaced by interpolated points in the updated set of sampling points.

As will be explained in the following, the generation of the updated set of sampling points may be designed to allow detection lines to be removed dynamically during operation of the touch-sensitive apparatus. For example, if an emitter or a sensor starts to perform badly, or not at all, during operation of the apparatus, this may have a significant impact on the reconstructed attenuation field. It is conceivable to provide the apparatus with the ability of identifying faulty detection lines, e.g. by monitoring temporal changes in output signal of the light sensors, and specifically the individual projection signals. The temporal changes may e.g. show up as changes in the energy/attenuation/transmission or the signal-to-noise ratio (SNR) of the projection signals. Any faulty detection line may be removed from the reconstruction. Such a touch-sensitive apparatus is disclosed in Applicant's U.S. provisional application No. 61/288,416, which was filed on Dec. 21, 2009 and which is incorporated herein by this reference. To fully benefit from such functionality, the touch-sensitive apparatus may be designed to have slightly more sensors and/or emitters than necessary to achieve adequate performance, such that it is possible to discard a significant amount of the projection values, for example 5%, without significantly affecting performance.

The re-calculation step (cf. step 42 in FIG. 4A) may be configured to dynamically (i.e. for each individual sensing instance) account for such faulty detection lines by, whenever a detection line is marked as faulty, removing the corresponding sampling point in the sample space and re-computing the interpolation function around that sampling point. Thereby, the density of sampling points is reduced locally (in the $\phi$-s-plane), but the reconstruction process will continue to work adequately while discarding information from the faulty detection line.

This is further illustrated in FIGS. 15-16. FIG. 15A is a close-up of two-dimensional interpolation function formed as an interpolation grid in the sample space. Assume that this interpolation function is stored for use in the re-calculation step for a complete set of sampling points. Also assume that the sampling point indicated by a circle in FIG. 15A corresponds to a detection line which is found to be faulty. In such a situation, the sampling point is removed, and the interpolation function is updated or recomputed based on the remaining sampling points. The result of this operation is shown in FIG. 15B. As shown, the change will be local to the triangles closest to the removed sampling point.

Figure 15A:
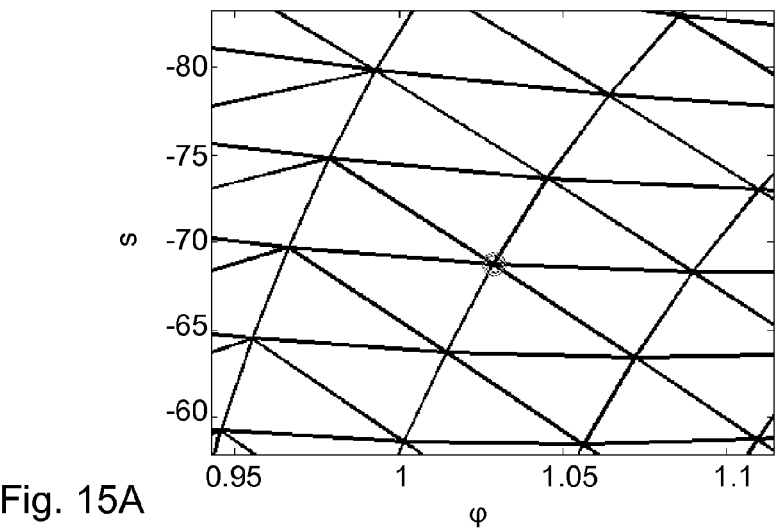
FIGS. 15A-15D and FIGS. 16A-16B illustrate how the 2D interpolation function is updated when sampling points are removed from reconstruction.
Figure 15B:
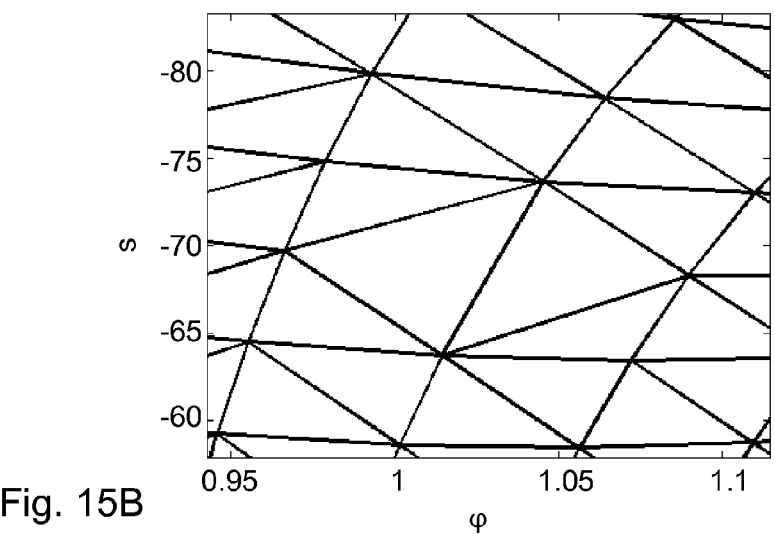
Figure 15C:
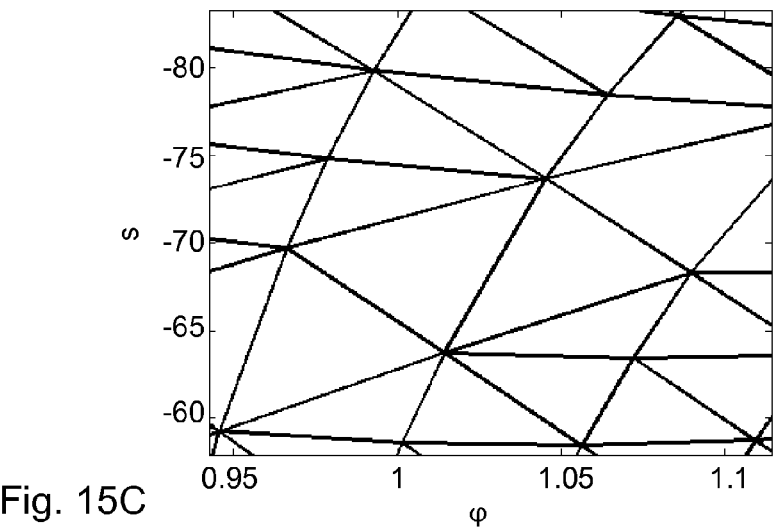
Figure 15D:
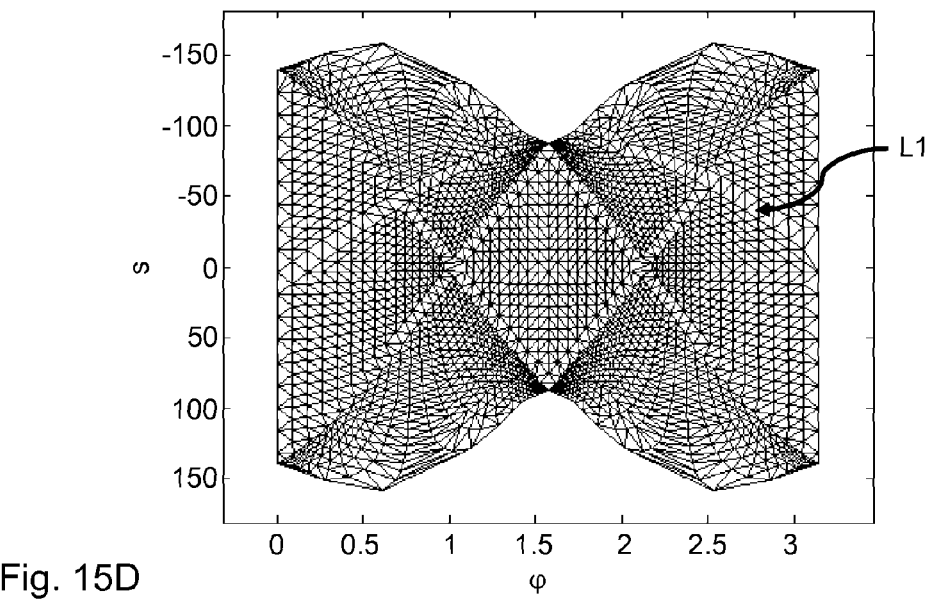

If an emitter is deemed faulty, all detection lines originating from this emitter should be removed. This corresponds to removal of a collection of sampling points and a corresponding update of the interpolation function. FIG. 15C illustrates the interpolation function in FIG. 15A after such updating, and FIG. 15D illustrates the updated interpolation function for the complete sample space. The removal of the detection lines results in a band of lower density (indicated by arrow L1), but the reconstruction process still works properly.

Figure 16A:
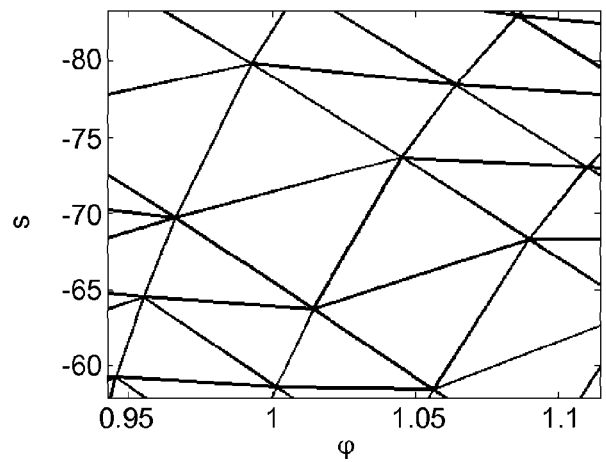
Figure 16B:
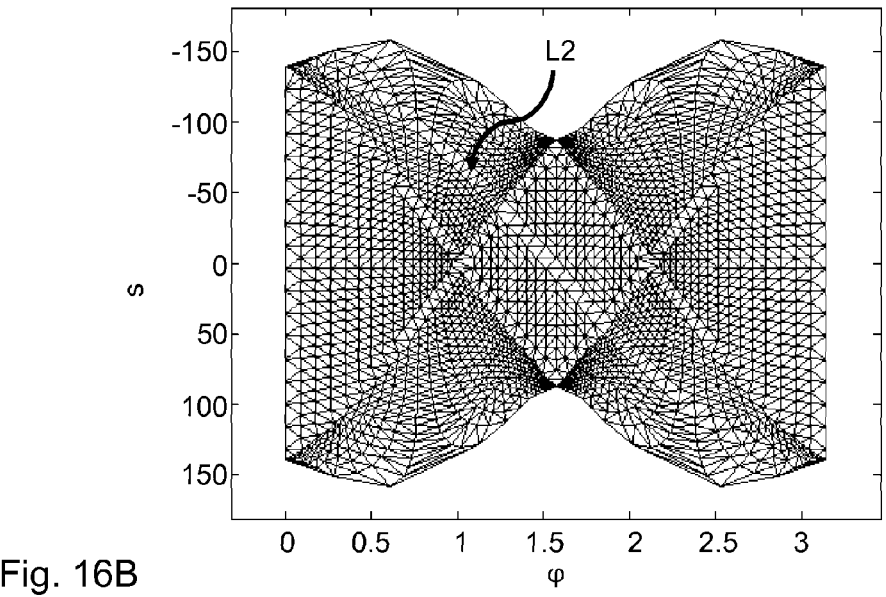

Instead, if a sensor is deemed faulty, all detection lines originating from this sensor should be removed. This is done in the same way as for the faulty emitter, and FIG. 16A illustrates the interpolation function in FIG. 15A after such updating. FIG. 16B illustrates the updated interpolation function for the complete sample space. The removal of the detection lines again results in a band of lower density (indicated by arrow L2), but the reconstruction process still works properly.

6.1.2 Example: Non-Interleaved Arrangement

The non-interleaved arrangement generally results in a different set of sampling points than the interleaved arrangement, as seen by comparing FIG. 12A and FIG. 12D. However, there is no fundamental difference between the interpolation solutions for these arrangements, and all embodiments and examples of reconstruction processing described above in relation to the interleaved arrangement are equally applicable to the non-interleaved arrangement. The following example therefore focuses on different techniques for handling the gap regions, i.e. regions without sampling points, which are obtained in non-interleaved arrangement.

Figure 17:
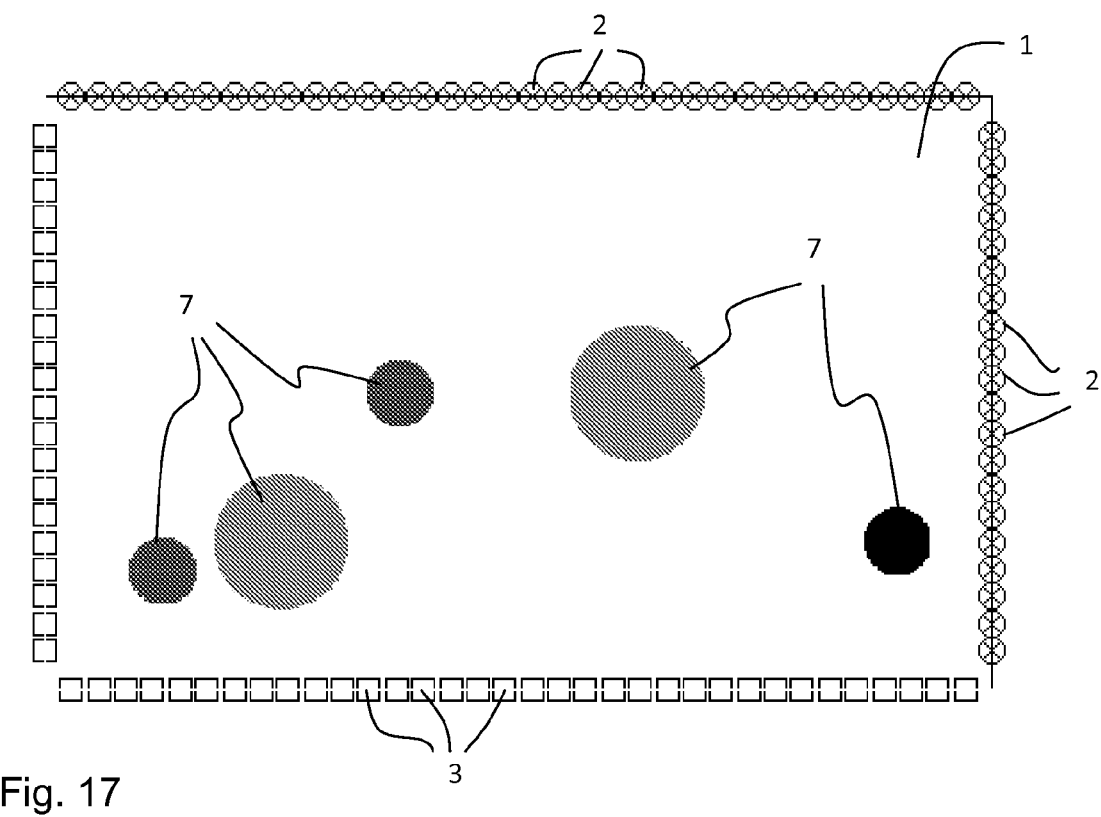
FIG. 17 is a reference image mapped to a non-interleaved arrangement.

The following example is given for the non-interleaved arrangement shown in FIG. 2B, assuming a reference image as shown in FIG. 17, i.e. the same reference image as in FIG. 13.

Figure 18A:
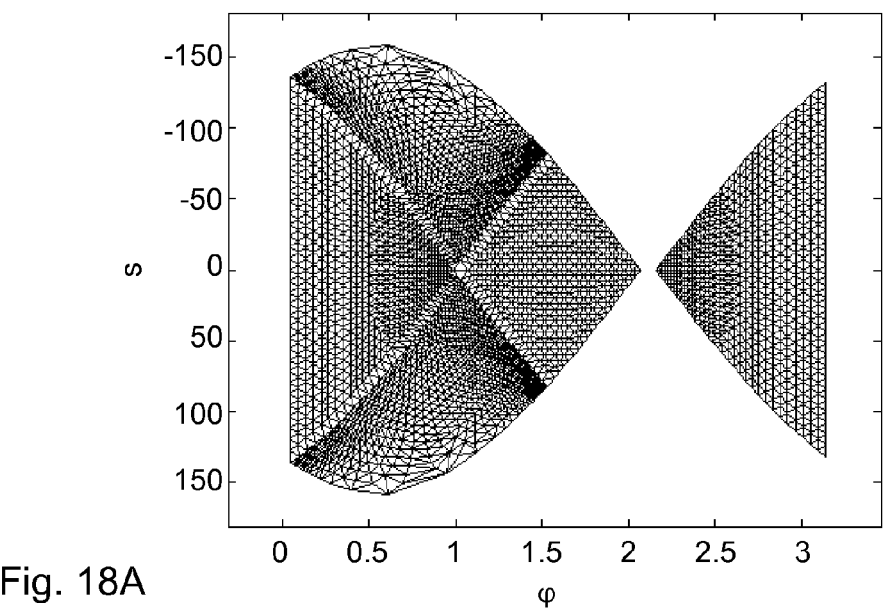
FIGS. 18A-18B illustrate a first variant for reconstruction in a non-interleaved arrangement.
Figure 18B:
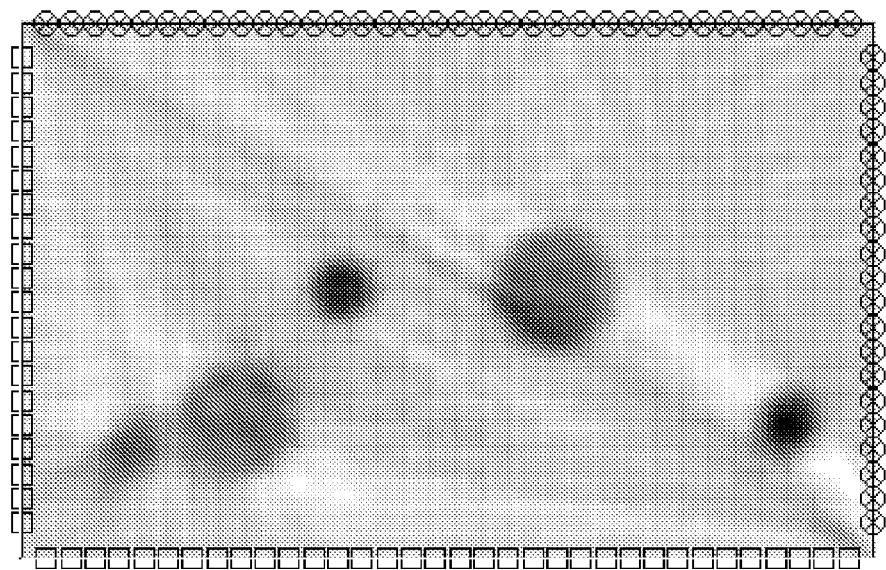

FIG. 18A is a plan view of the resulting interpolation function, where a mesh of non-overlapping triangles have been adapted to the sampling points in the sample space. Thus, this example forms the interpolation function directly from the original sampling points. Since the sample space contain contiguous gap regions (see FIG. 12D), the resulting interpolation function is undefined in these gap regions, or stated differently, the values at the implicit sampling points in the gap regions are set to zero. The interpolation function in FIG. 18A may be used to generate an updated set of sampling points, like in the foregoing examples. FIG. 18B illustrates the reconstructed attenuation field that is obtained by calculating the interpolated projection values for the reference image in FIG. 17, operating the 1D filter of the result, and applying the back projection operator on the result of the filtered data. The reconstructed attenuation field has merit values: $m_1=0.7413$ and $m_2=1.2145$.

Figure 19A:
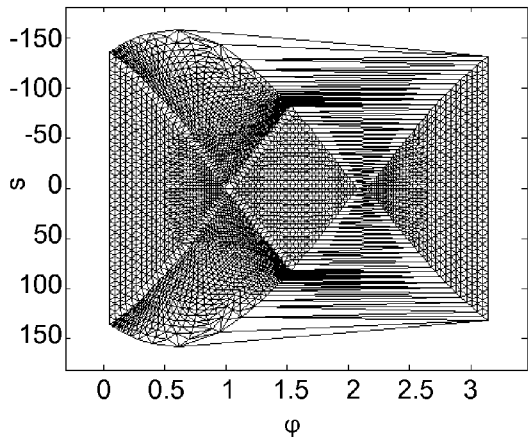
FIGS. 19A-19B illustrate a second variant for reconstruction in a non-interleaved arrangement.
Figure 19B:
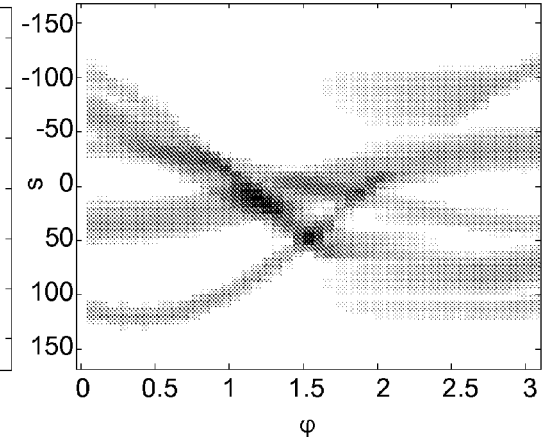

An alternative approach to handling the gap regions is to extend the interpolation function across the gap regions, i.e. to extend the mesh of triangles over the gap regions, as shown in FIG. 19A. The interpolation function in FIG. 18A may thus be used to generate desirable interpolation points within the entire sample space, i.e. also in the gap regions. FIG. 19B illustrates the interpolated projection values calculated for the reference image in FIG. 17. It can be seen that projection values are smeared out into the gap regions in the $\phi$-s-plane. The reconstructed attenuation field (not shown), obtained after 1D filtering and back projection, has merit values: $m_1=0.8694$ and $m_2=1.4532$, i.e. slightly better than FIG. 18B.

Figure 20A:
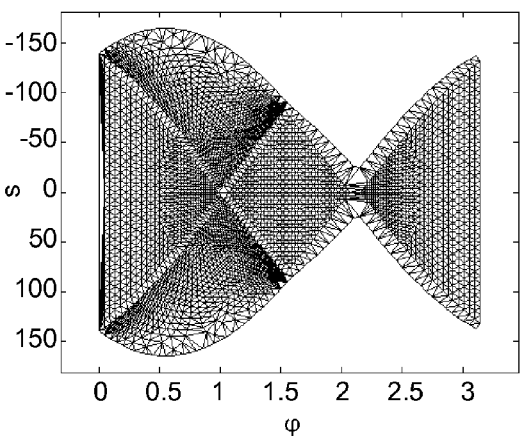
FIGS. 20A-20B illustrate a third variant for reconstruction in a non-interleaved arrangement.
Figure 20B:
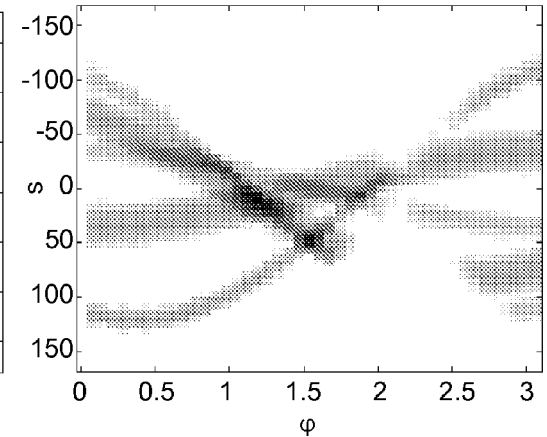

Yet another alternative approach is to add some border vertices to the interpolation function in the gap regions, where these border vertices form a gradual transition from the original sampling points to zero values, and letting the interpolation function be undefined/zero in the remainder of the gap regions. This results in a smoother transition of the interpolation function into the gap regions, as seen in FIG. 20A. FIG. 20B illustrates the interpolated projection values calculated for the reference image in FIG. 17. The reconstructed attenuation field (not shown), obtained after 1D filtering and back projection, has merit values: $m_1=0.8274$ and $m_2=1.4434$, i.e. slightly better than FIG. 18B.

All of the three above-described approaches lead to reconstructed attenuation fields of approximately the same quality.

Below follows a description of a technique for improving the quality further, by improving the estimation of sampling points in the gap regions.

Figure 21A:
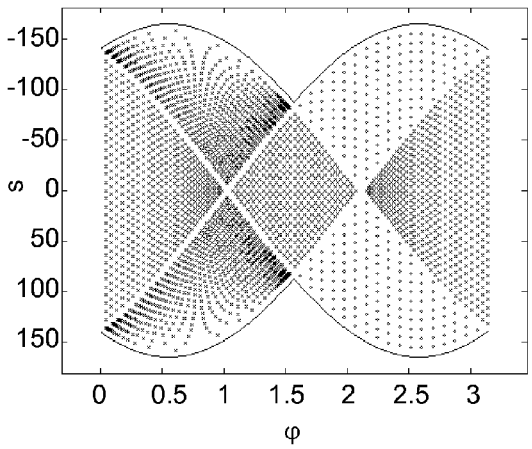
FIGS. 21A-21B illustrate a fourth variant for reconstruction in a non-interleaved arrangement.
Figure 21B:
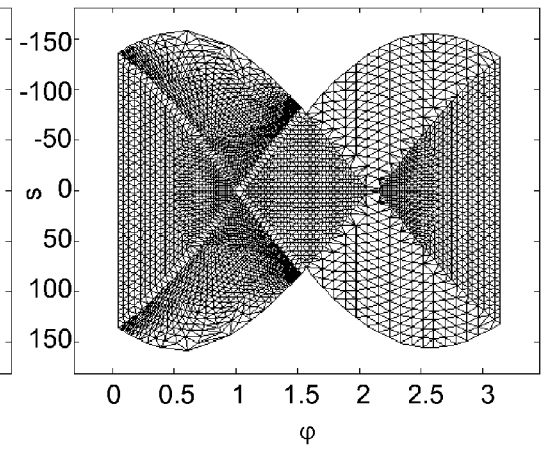

This improved technique for generating estimation points in the gap regions will be described in relation to FIGS. 22-23. It is to be noted that this technique may also be applied to populate gaps formed by removal of faulty detection lines, as a supplement or alternative to the technique discussed in section 6.1.1. Generally, the estimation points may be selected to match the standard geometries, like the interpolation points, possibly with a lower density than the interpolation points. FIG. 21A illustrates the sample space supplemented with such estimation points in the gap regions. Like in the foregoing examples, an interpolation function is generated based on the sample space, in this case based on the combination of sampling points and interpolation points. FIG. 21B illustrates the resulting interpolation function.

The aim is to obtain a good estimate for every added estimation point. This may be achieved by making assumptions about the touching objects, although this is not strictly necessary. For example, if it can be presumed that the touching objects are fingertips, it can be assumed that each touching object results in a top hat profile in the attenuation field with a circular or ellipsoidal contour. Unless the number of touching objects is excessive, there will exist, for each touching object, at least one detection line that interacts with this touching object only. If it is assumed that the touch profiles are essentially round, the touch profile will cause essentially the same attenuation of all detection lines that are affected by the touch profile.

The value at each estimation point, in the $\phi$-s-plane (marked with diamonds in FIG. 21A), represents a line integral along a specific line on the touch surface. Since the estimation points are located in the gap region, there is no real (physical) detection line that matches the specific line. Thus, the specific line is a virtual line in the x-y-plane (i.e. a fictitious detection line, although it does not correspond to an interpolation point but to an estimation point). The value at the estimation point may be obtained by analyzing selected points along the virtual line in the x-y-plane. Specifically, a minimum projection value is identified for each selected point, by identifying minimum projection value for the ensemble of detection lines (actual or fictitious) that passes through the selected point. This means that, for every analyzed point, the algorithm goes through the different detection lines passing through the point and identifies the lowest value of all these detection lines. The value of the estimation point may then be given by the maximum value of all identified minimum projection values, i.e. for the different analyzed points, along the virtual line.

Figure 22A:
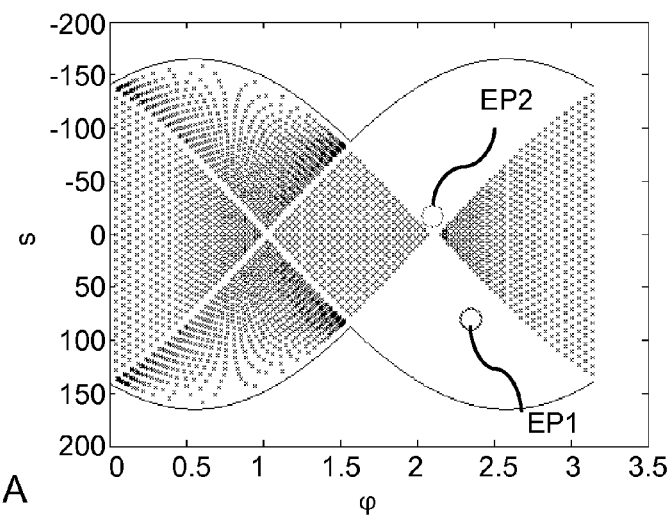
FIGS. 22A-22F illustrate a fifth variant for reconstruction in a non-interleaved arrangement.
Figure 22B:
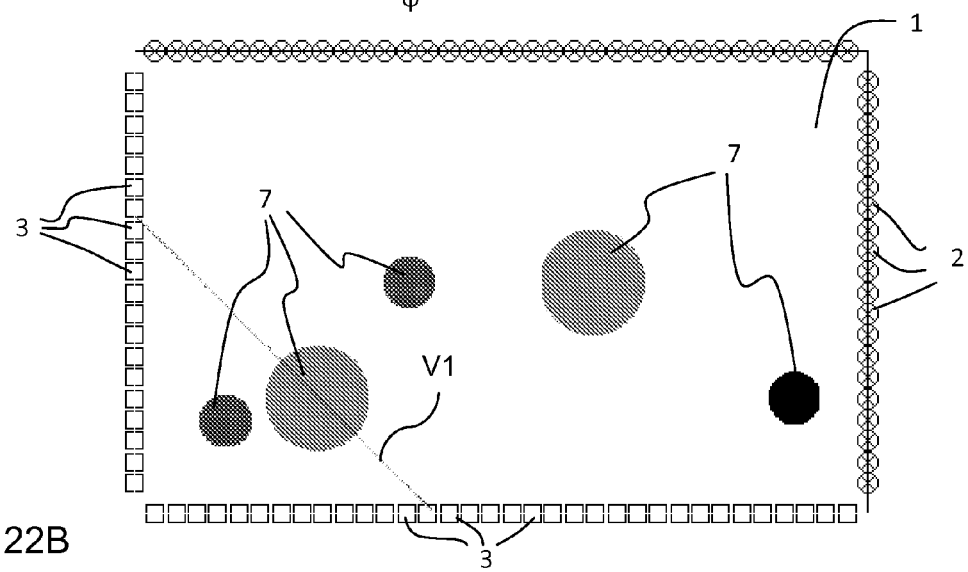
Figure 22C:
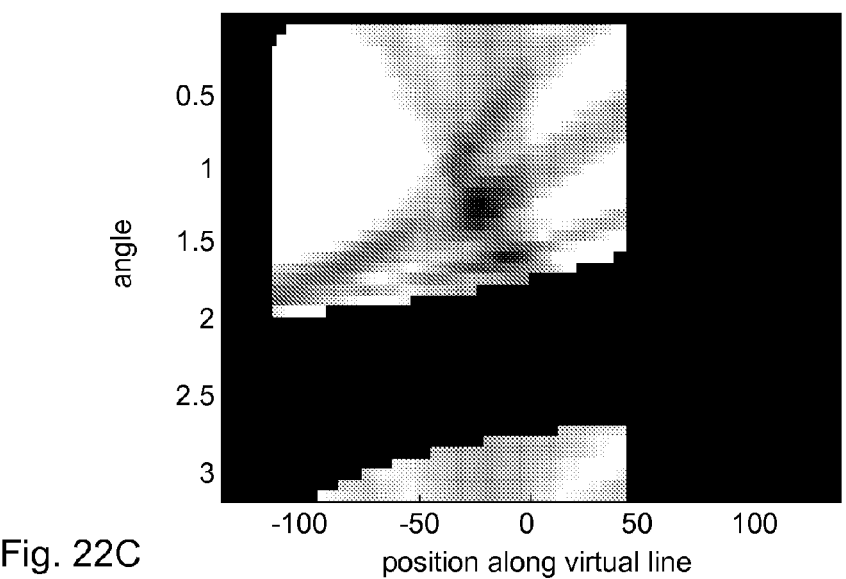
Figure 22D:
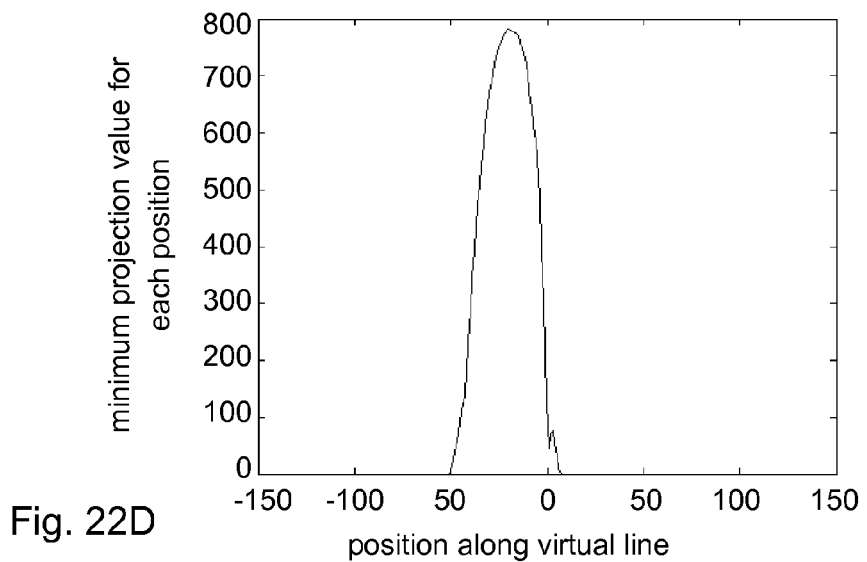

To explain this approach further, FIG. 22A illustrates the original sampling points together with two estimation points EP1, EP2 indicated by circles. The estimation point EP1 corresponds to a virtual line V1, which is indicated in the reference image of FIG. 22B. The next step is to evaluate selected points along the virtual line V1. For every selected point, the projection values for all intersecting detection lines are collected. The result is shown in the two-dimensional plot of FIG. 22C, which illustrates projection values as a function of detection line (represented by its angle) and the selected points (given as position along the virtual line). The large black areas in FIG. 22C correspond to non-existing detection lines. To find the value of the estimation point EP1, the data in FIG. 22C is first processed to identify the minimum projection value (over the angles) for each selected point along the virtual line V1. The result is shown in the graph of FIG. 22D.

Figure 22E:
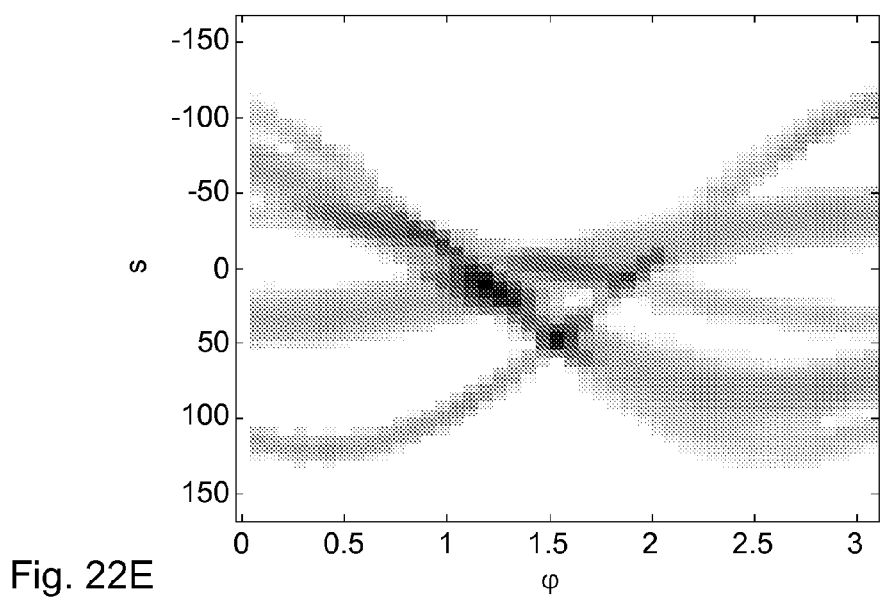
Figure 22F:
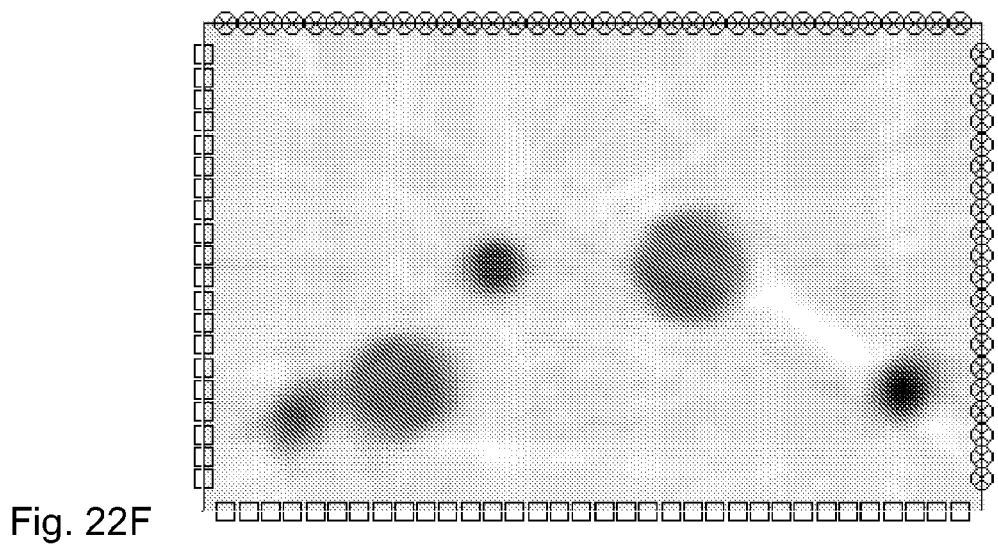

The value of the estimation point EP1 is then selected as the maximum of these minimum projection values. FIG. 22E illustrates the values of all estimation points in FIG. 21A calculated for the reference image in FIG. 17 using this approach, together with the interpolated projection values. By comparing FIG. 19B and FIG. 20B, a significant improvement is seen with respect to the information in the gap regions of the sample space. The reconstructed attenuation field, obtained after 1D filtering and back projection, is shown in FIG. 22F and has merit values: $m_1=1.2085$ and $m_2=2.5997$, i.e. much better than FIG. 18B.

Figure 23A:
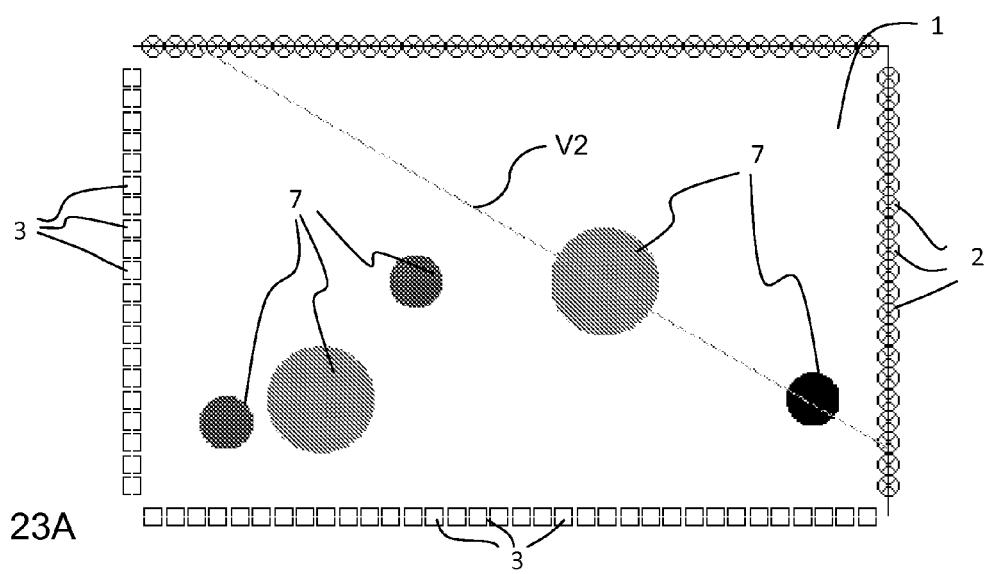
FIGS. 23A-23E illustrate a sixth variant for reconstruction in a non-interleaved arrangement.
Figure 23B:
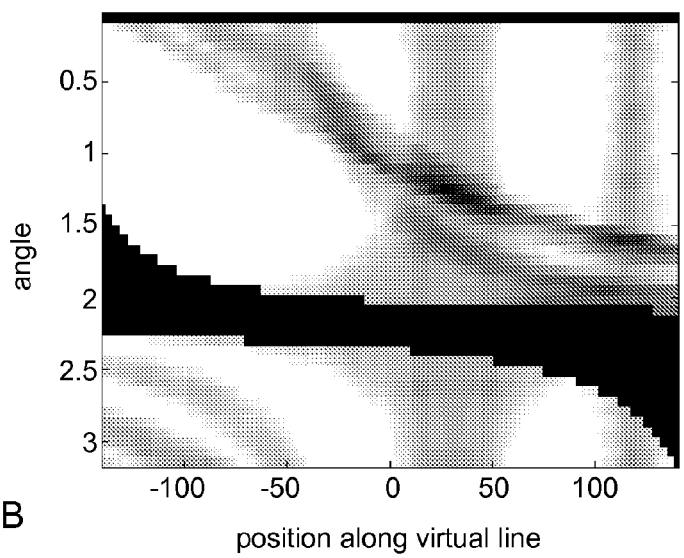
Figure 23C:
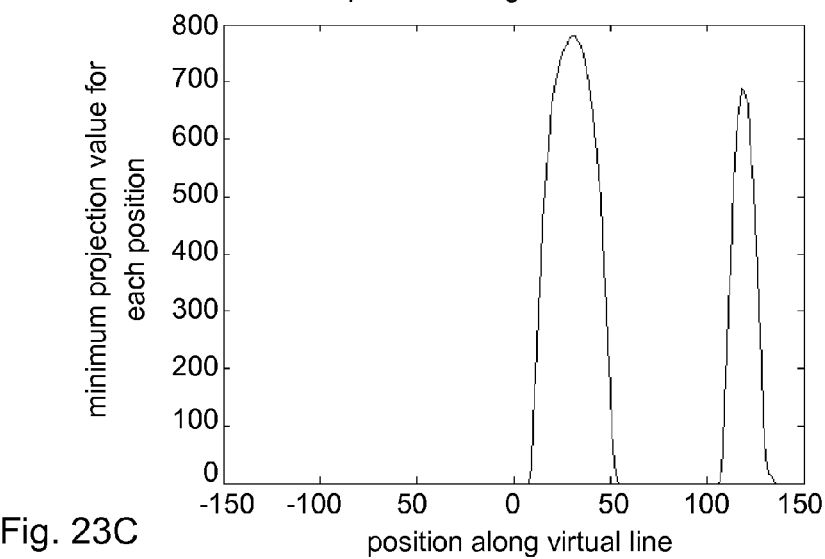
Figure 23D:
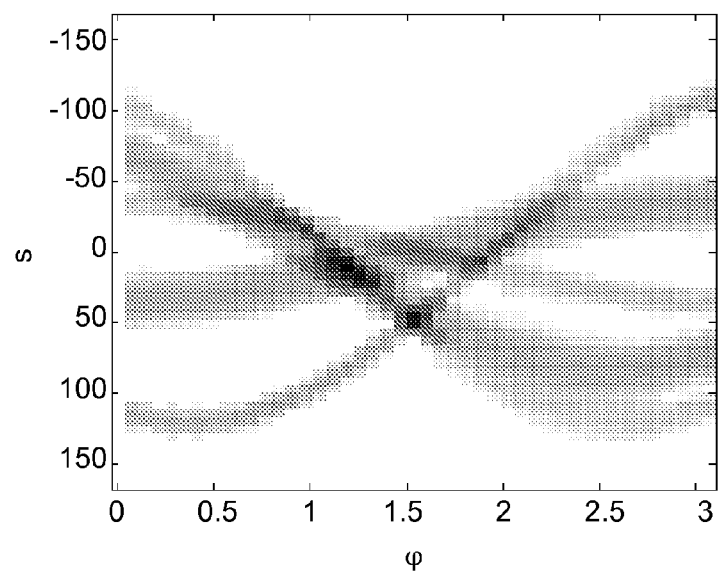
Figure 23E:
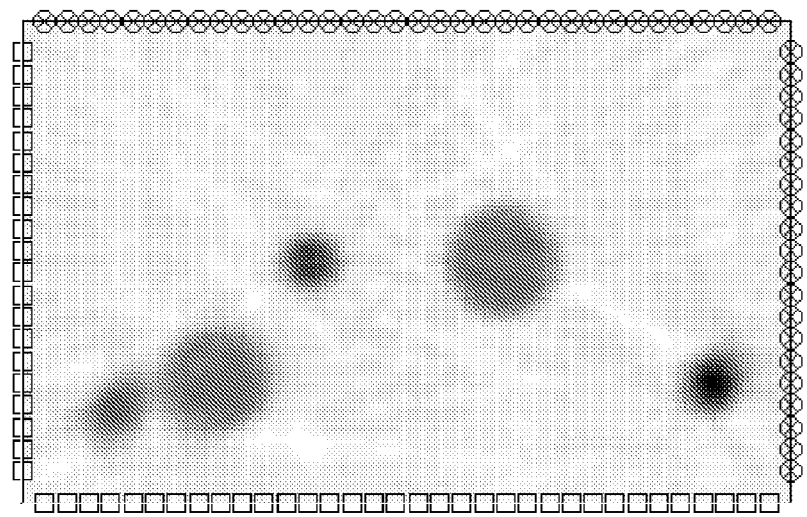

It is possible to improve the estimation process further. Instead of choosing the maximum among the minimum projection values, the process may identify the presence of plural touch profiles along the investigated virtual line and combine (sum, weighted sum, etc) the maximum projection values of the different touch profiles. To explain this approach further, consider the estimation point EP2 in FIG. 22A. The estimation point EP2 corresponds to a virtual line V2, which is indicated in the reference image of FIG. 23A Like in the foregoing example, selected points along the virtual line V2 are evaluated. The result is shown in the two-dimensional plot of FIG. 23B. Like in the foregoing example, the data in FIG. 23B is then processed to identify the minimum projection value (over the angles) for each selected point along the virtual line V2. The result is shown in the graph of FIG. 23C. This graph clearly indicates that there are two separate touch profiles on the virtual line V2. Thus, the estimation process processes the maximum projection values in FIG. 23C to identify local maxima (in this example two maxima), and sets the value of the estimation point EP2 equal to the sum of the local maxima (projection values). FIG. 23D illustrates the values of all estimation points in FIG. 21A calculated for the reference image in FIG. 17 using this approach, together with the interpolated projection values. The gap regions of the sample space are represented by relevant information. The reconstructed attenuation field, obtained after 1D filtering and back projection, is shown in FIG. 23E and has merit values: $m_1=1.2469$ and $m_2=2.6589$, i.e. slightly better than FIG. 22F.

Figure 24:
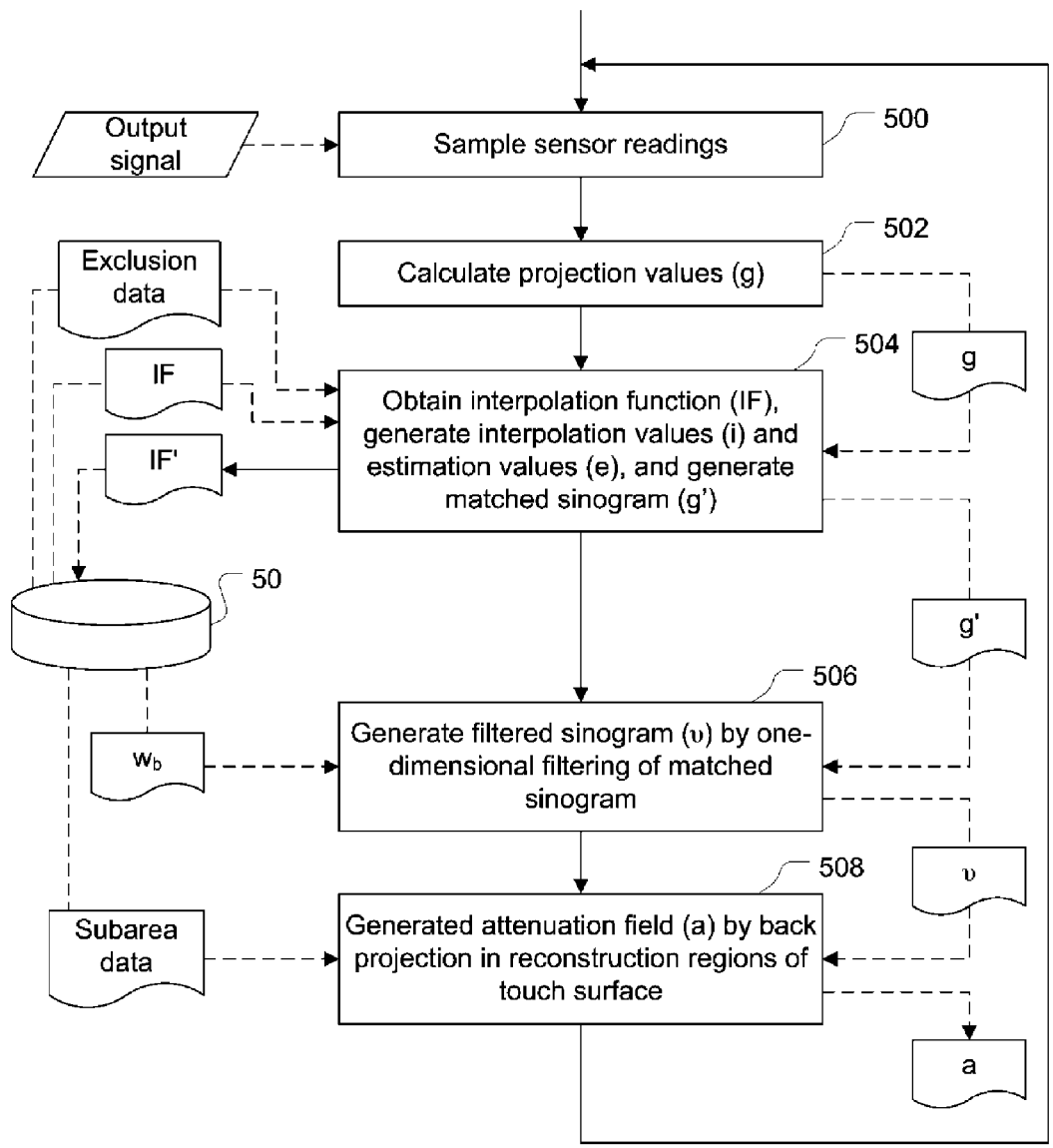
FIG. 24 is a flowchart of a process for filtered back projection.

FIG. 24 is a flowchart of an exemplifying reconstruction process, which is a more detailed version of the general process in FIG. 4A adapted for data processing in a touch-sensitive apparatus with a non-interleaved arrangement. The process operates on the output signal from the light sensor arrangement, using data stored in a system memory 50, and intermediate data generated during the process. It is realized that the intermediate data also may be stored temporarily in the system memory 50 during the process. The flowchart will not be described in great detail, since the different steps have already been explained above.

In step 500, the process samples the output signal from the light sensor arrangement. In step 502, the sampled data is processed for calculation of projection values (g). In step 504, the process reads the interpolation function (IF) from the memory 50. The interpolation function (IF) could, e.g., be designed as any one of the interpolation functions shown in FIGS. 18A, 19A, 20A and 21B. The process also reads "exclusion data" from the memory 50, or obtains this data directly from a dedicated process. The exclusion data identifies any faulty detection lines that should be excluded in the reconstruction process. The process modifies the interpolation function (IF) based on the exclusion data, resulting in an updated interpolation function (IF') which may be stored in the memory 50 for use during subsequent iterations. Based on the updated interpolation function (IF'), and the projection values (g), step 504 generates new projection values ("interpolation values", i) at given interpolation points. Step 504 may also involve a calculation of new projection values ("estimation values", e) at given estimation points in the gap regions, based on the updated interpolation function (IF'). Step 504 results in a matched sinogram (g'), which contains the interpolation values and the estimation values. In step 506, the process reads the filter kernel ($w_b$) from the memory 50 and operates the kernel in one dimension on the matched sinogram (g'). The result of step 506 is a filtered sinogram (v). In step 508, the process reads "subarea data" from the memory 50, or obtains this data directly from a dedicated process. The subarea data indicates the parts of the attenuation field/touch surface to be reconstructed. Based on the subarea data, and the filtered sinogram (v), step 510 generates a reconstructed attenuation field (a), which is output, stored in memory 50, or processed further. Following step 508, the process returns to step 500.

It is to be understood that a similar process may be applied for data processing in a touch-sensitive apparatus with an interleaved arrangement.

6.2 Re-Calculation into Fan Geometry

The following example will illustrate the re-calculation into a standard fan geometry for an interleaved arrangement. Since the re-calculation is made for a fan geometry, the following examples are given for the β-α-plane.

6.2.1 Example: Interleaved Arrangement

This example is given for the interleaved arrangement shown in FIG. 2A, assuming a reference image as shown in FIG. 13.

A first implementation of the re-calculation step (cf. step 42 in FIG. 4A) will be described with reference to FIG. 25. In the first implementation, the sampled data is "squeezed" to fit a specific fan geometry. This means that the projection values obtained for the detection lines of the interleaved arrangement are re-assigned to fictitious detection lines that match a fan geometry, in this example the geometry of an equiangular fan beam tomograph. Making such a re-assignment may involve a step of finding the best guess for an equiangular spacing of the $\beta_i$ values, and for the $\alpha_k$ values. In this example, the $\beta_i$ values for the sampling points are re-interpreted to be consistent with the angles of an equiangular fan beam tomograph. This essentially means that the difference in rotation angle between the different incoupling points is considered to be the same around the perimeter of the touch surface, i.e. $\delta\beta=2\cdot\pi/M$, where M is the total number of emitters (incoupling points). The $\alpha_k$ values for the sampling points are re-interpreted by postulating that the $\alpha_k$ values are found at $n\cdot\delta\alpha$, where $-\leq n \leq N$ and $2N+1$ is the total number of sensors (outcoupling points) that receive light energy from the relevant emitter. To get accurate ordering of the $\alpha_k$ values, n=0 may be set as the original sample with the smallest value of $\alpha_k$.

Figure 25A:
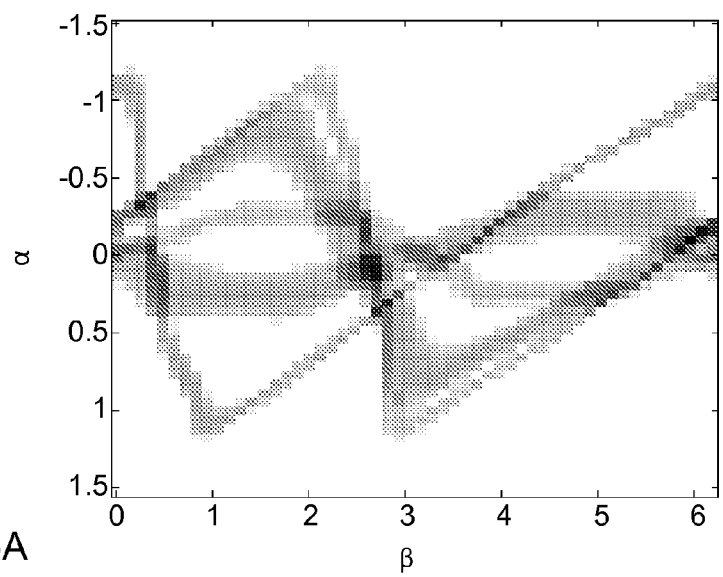
FIGS. 25A-25B illustrate a first variant for reconstruction in an interleaved arrangement using a tomographic algorithm designed for fan geometry.
Figure 25B:
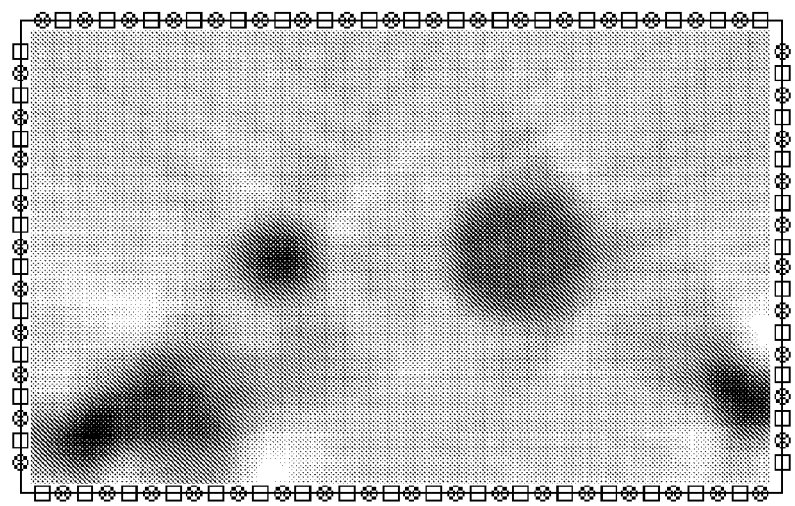

FIG. 25A illustrates the sampling points in the β-α-plane, after this basic reassignment of projection values. After angle correction, 1D filtering of the angle-corrected data, and back projection, a reconstructed attenuation field is obtained as shown in FIG. 25B. It is evident that the first implementation is able to reproduce the original image (FIG. 13), but with a rather low quality, especially in the corner regions.

In a second implementation of the re-calculation step, the measured projection values are processed for calculation of new (updated) projection values for fictitious detection lines that match a fan geometry. In the second implementation, like in the first implementation, each emitter (incoupling point) on the perimeter of the touch surface is regarded as the origin of a set of detection lines of different directions. This means that every $\beta_i$ value corresponds to an emitter (incoupling point) in the interleaved arrangement, which generates a plurality of detection lines with individual angular directions $\alpha_k$, and the sampling points defined by the actual $\beta_i$ values and $\alpha_k$ values thus form columns in the $\beta$-$\alpha$-plane. Therefore, interpolation in the $\beta_i$ direction can be omitted, and possibly be replaced by a step of adding an individual weighting factor to the back projection operator (by changing $\delta\beta$ to $\delta\beta_i$, which should correspond to the difference in $\beta_i$ values between neighboring emitters). In the second implementation, the recalculation step involves an interpolation with respect to the $\alpha_k$ variable, suitably to provide values of interpolation points having an equidistant separation with respect to the $\alpha_k$ variable for each $\beta_i$ value in the sampling space. Thus, the interpolation of the sampling points may be reduced to applying a 1D interpolation function. The 1D interpolation function may be of any type, such as linear, cubic, spline, Lanczos, Sinc, etc. In following example, the interpolation function is linear. It should be noted, though, that a 2D interpolating function as described in section 6.1 above can alternatively be applied for interpolation in the $\beta$-$\alpha$-plane.

Figure 26A:
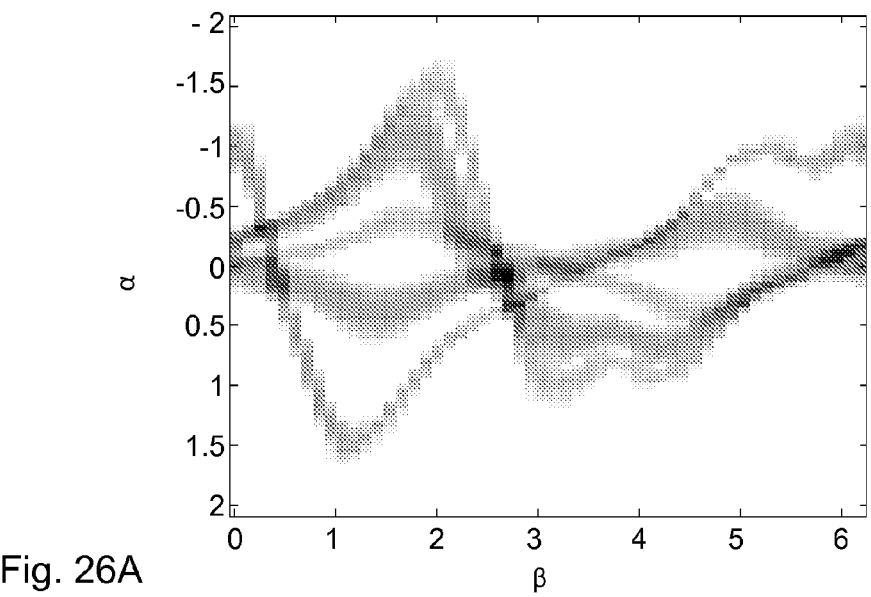
FIGS. 26A-26B illustrate a second variant for reconstruction in an interleaved arrangement using a tomographic algorithm designed for fan geometry.
Figure 26B:
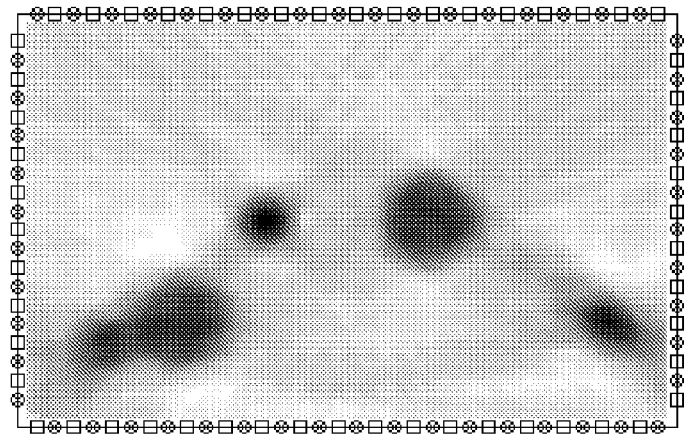

FIG. 26A illustrates the sampling points in the $\beta$-$\alpha$-plane, after the 1D interpolation. FIG. 26B shows the reconstructed attenuation field which is obtained after angle correction, 1D filtering of the angle-corrected data, and back projection. By comparing FIG. 26B with FIG. 25B, it can be seen that the second implementation provides a significant quality improvement compared to the first implementation.

Further, by comparing FIG. 26B with FIG. 14D, which both illustrate reconstructed attenuation fields for the interleaved arrangement, it may appear as if the parallel geometry may result in a higher reconstruction quality than the fan geometry. This apparent quality difference may have several causes. First, reconstruction algorithms for the fan geometry restrict the direction angle $\alpha$ to the range $-\pi/2 \le \alpha \le \pi/2$. Direction angles outside this range will cause the angle correction (see section 5.2) to deteriorate. In the touch-sensitive apparatus, detection lines may have direction angles outside this range, especially for emitters located the corners of the touch surface (recalling that $\alpha=0$ for a line going from the emitter through the origin, i.e. the center of the touch surface). Second, the weighted back projection operator (see section 5.2) involves a normalization based on the inverse of the squared distance between the source and the reconstructed position. This distance becomes close to zero near the perimeter of the touch surface and its inverse goes towards infinity, thereby reducing the reconstruction quality at the perimeter. Still further, the standard reconstruction algorithms assume that all sensors (outcoupling points) are arranged at the same distance from the emitters (incoupling points).

Figure 27:
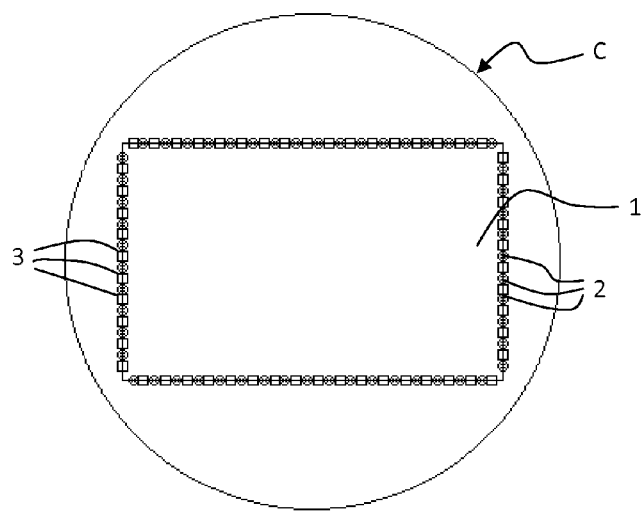
FIG. 27 illustrates the use of a circle for defining a two-dimensional sample space of a touch-sensitive apparatus.

A third implementation of the re-calculation step will now be described with reference to FIGS. 27-28. In the third implementation, which is designed to at least partially overcome the above-mentioned limitations of the first and second implementations, the detection lines are defined based on fictive emitter/sensor locations. FIG. 27 illustrates the touch-sensitive apparatus circumscribed by a circle C which may or may not be centered at the origin of the x,y coordinate system (FIG. 2) of the apparatus. The emitters 2 and sensors 3 provide a set of detection lines (not shown) across the touch surface 1. To define the detection lines in a $\beta$-$\alpha$-plane, the intersection of each detection line and the circle C is taken to define a $\beta_i$ value, whereas the $\alpha_k$ value of each detection line is given by the inclination angle of the detection line with respect to a reference line (like in the other fan geometry examples given herein). Thereby, the $\beta$ and $\alpha$ variables are defined in strict alignment with the theoretical definition depicted in FIG. 9, where the $\beta$ variable is defined as a rotation angle along a circular perimeter.

Figure 28A:
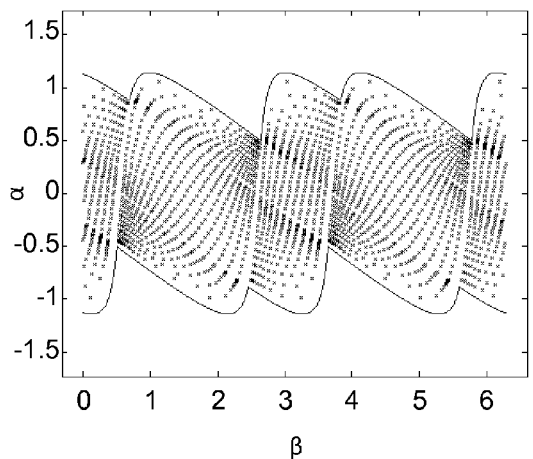
FIG. 28A-28D illustrate a third variant for reconstruction in an interleaved arrangement using a tomographic algorithm designed for fan geometry.
Figure 28B:
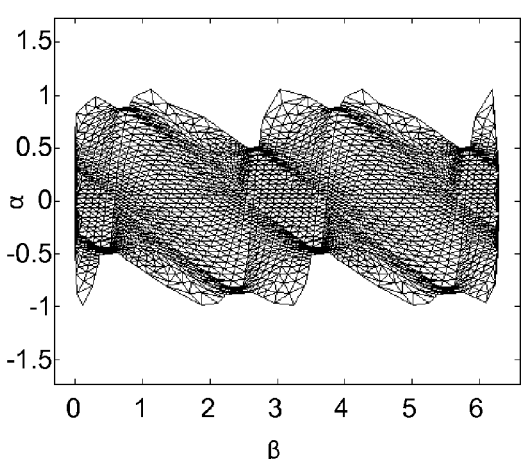
Figure 28C:
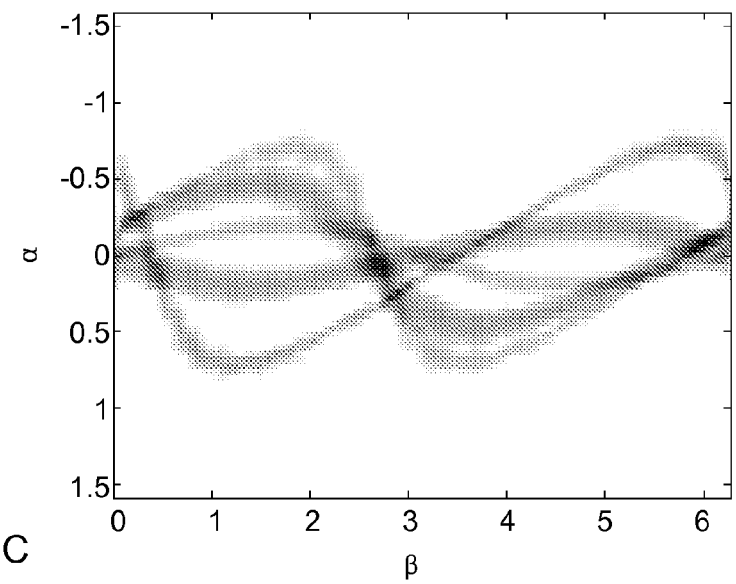
Figure 28D:
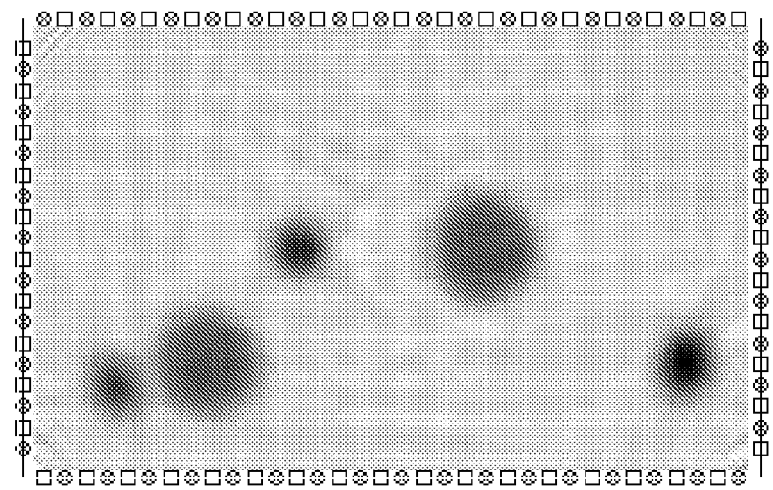

FIG. 28A illustrates the resulting sampling points in the $\beta$-$\alpha$-plane for the interleaved system shown in FIG. 27, where the $\beta_i$ values are defined according to the foregoing "fictive circle approach". The sampling space contains a highly irregular pattern of sampling points. FIG. 28B is a plan view of a 2D interpolation function fitted to the sampling points in FIG. 28A. It should be realized that the techniques described in sections 6.1.1 and 6.1.2 may be applied also to the sampling points in the $\beta$-$\alpha$-plane to generate interpolation/estimation points that represent fictitious detection lines matching a standard fan geometry. Thus, the interpolation/estimation points are suitably generated to form columns with respect to the $\beta$ variable, preferably with equidistant spacing. FIG. 28C illustrates the interpolated sinogram, which is obtained by operating the interpolation function in FIG. 28B on the projection values that are given by the reference image in FIG. 13. FIG. 28D shows the reconstructed attenuation field which is obtained after angle correction, 1D filtering of the angle-corrected data, and back projection. By comparing FIG. 28D with FIG. 26B, it can be seen that the third implementation provides a significant quality improvement compared to the first and second implementations.

In all of the above implementations, the re-calculation step results in an updated sinogram, in which each $\beta$ value and its associated $\alpha$ values (i.e. each column in the sinogram) corresponds to a fan of detection lines with a common origin, and thus the data is matched to a fan geometry in a broad sense.

6.3 Re-Calculation by Fourier Transformation

In tomography theory, it is generally assumed that $g(\varphi, s)$ is bandwidth limited. Thereby, it is possible to use Fourier transformation algorithms to perform the recalculation step (step 42 in FIG. 4A) so as to form the above-mentioned updated set of sampling points.

There is a class of Fourier transformation algorithms that are designed to enable Fourier transformation of irregularly sampled data. These algorithms may e.g. involve interpolation and oversampling of the original data, e.g. using least-squares, iterative solutions or Fourier expansion (Shannon's sampling theorem). This type of Fourier transformation algorithm comes in many different names and flavors, e.g. Non-Uniform FFT (NUFFT/NFFT), Generalized FFT (GFFT), Non-uniform DFT (NDFT), Non-Equispaced Result FFT (NER), Non-Equispaced Data FFT (NED), and Unequally spaced FFT (USFFT).

In the following, a brief example is given on the use of the NED algorithm in a recalculation step into a standard parallel geometry. The theory behind the NED algorithm is further described in the article "Non-Equispaced Fast Fourier Transforms with Applications to Tomography" by K Fourmont, published in "Journal of Fourier Analysis and Applications", Volume 9, Number 5, pages 431-450 (2003), which is incorporated herein by this reference.

The example involves two FFT operations on the original set of projection values in the sinogram $g(\varphi, s)$. First, a two-dimensional NED FFT algorithm is operated on the sinogram:

$$\hat{g}(\vartheta, \sigma) \xleftarrow{F_2} g(\varphi_k, s_k),$$

whereby the Fourier transform of the sinogram is computed. As noted above, the NED algorithm is designed to process irregularly sampled data, and the resulting Fourier coefficients $(\theta, \sigma)$ will be arranged in a Cartesian grid. Then, a regular two-dimensional inverse FFT algorithm is operated on the Fourier coefficients to get an updated set of projection values arranged in a standard geometry, in this example a parallel geometry:

$$g(\varphi, s) \xleftarrow{F_2^{-1}} \hat{g}(\vartheta, \sigma).$$

A regular inverse FFT algorithm can be used since both the input data $\hat{g}(\theta, \sigma)$ and the output data $g(\phi, s)$ are arranged on a Cartesian grid.

In this example, it may be advantageous for the c·N-periodicity of the recalculation step to be for $\phi=2\pi$. This may be achieved by mirroring the sinogram values before applying the NED FFT algorithm: $g(\phi, s)=g(\phi-\pi, -s)$ for $\pi \leq \phi < 2\pi$. However, this extension of the sinogram is not strictly necessary. In a variant, it is merely ensured that the wrapping behavior of the c·N-periodicity is consistent with the mirroring of the sinogram values.

It can be noted that the above example is equally applicable for re-calculation into a fan geometry, by changing $(\phi, s)$ to $(\alpha, \beta)$.

It is also to be understood that the re-calculation is not limited to the use of the NED FFT algorithm, but can be achieved by applying any other suitable Fourier transformation algorithm designed for irregularly sampled data, e.g. as listed above.

6.4 Re-Calculation by Weighted Average Interpolation

The interpolation in the re-calculation step (step 42 in FIG. 4A) may be based on a weighted average algorithm. Like Delaunay triangulation, the weighted average algorithm involves applying a linear operator on the measured projection values, with the coefficients in the linear operator being given by the known locations of the original sampling points and the interpolation points in the sample space.

One benefit of weighted average interpolation is that the computation of the coefficients may be simple to implement, e.g. compared to Delaunay triangulation. Another benefit is the possibility of doing on-the-fly computation of the coefficients in the linear operator (instead of using pre-computed coefficients) if available memory is limited, e.g. when the signal processor (10 in FIG. 1) is implemented as an FPGA.

These benefits will be further illustrated by way of an example, in which a weighted average algorithm is used for on-the-fly interpolation of original projection values $g(\phi_k, s_k)$ into a matched sinogram $g'(\phi'_i, s'_j)$, in three steps S1-S3. Reverting to FIG. 14B, the original projection values correspond to the sampling points (stars), and the matched sinogram corresponds to the interpolation points (circles). In the following example, the weight function is represented as $F_{WF}$:

S1. Initialize an accumulator sinogram, $acc(\phi'_i, s'_j)$, and a weight sinogram, $w(\phi'_i, s'_j)$, by setting them to zero.

S2. For each sampling point $(\phi_k, s_k)$, execute the following sequence of sub-steps i.-iii. for all interpolation points $(\phi'_i, s'_j)$:
  i. $\omega = F_{WF}(\Delta\phi, \Delta s) = F_{WF}(\phi_k - \phi'_i, s_k - s'_j)$
  ii. $acc(\phi'_i, s'_j) = acc(\phi'_i, s'_j) + \omega \cdot g(\phi_k, s_k)$
  iii. $w(\phi'_i, s'_j) = w(\phi'_i, s'_j) + \omega$ S3. For each interpolation point $(\phi'_i, s'_j)$, compute the matched sinogram:
  If $w(\phi'_i, s'_j) > 0$, then set $g'(\phi'_i, s'_j) = acc(\phi'_i, s'_j)/w(\phi'_i, s'_j)$, otherwise set $g'(\phi'_i, s'_j) = 0$ There are numerous weight functions $F_{WF}$ that may be used in this and other examples. One characteristic of a suitable weight function $F_{WF}$ is that it decreases as $|\Delta\phi|, |\Delta s|$ increase.

The constants in the weight function $F_{WF}$ may be chosen such that each projection value $g(\phi_k, s_k)$ contributes to only one or a few interpolation points $(\phi'_i, s'_j)$. This makes it possible to speed up the interpolation significantly since step S2 is reduced to an accumulation in the vicinity of the respective sampling point $(\phi_k, s_k)$. In one example, the sub-steps i.-iii. are only executed for the 3×3 interpolation points $(\phi'_i, s'_j)$ that are closest to each sampling point $(\phi_k, s_k)$ in the sample space.

A few non-limiting examples of weight functions include: $F_{WF}(\Delta\phi, \Delta s) = e^{-(\Delta\phi^2/2\sigma_\phi^2 + \Delta s^2/2\sigma_s^2)}$, and $F_{WF}(\Delta\phi, \Delta s) = 1/(1+\alpha_1 \cdot \Delta\phi^2 + \alpha_2 \cdot \Delta s^2)$, where $\sigma_\phi, \sigma_s, \alpha_1, \alpha_2$ are constants.

Generally, the interpolation by weighted average may be seen to involve, for each interpolation point, a step of calculating a weighted contribution to the value of the interpolation point from at least a subset of the sampling points (e.g. implemented by S2: i.-ii.), and a step of aggregating the weighted contributions (e.g. implemented by S2: iii. and S3), wherein each weighted contribution is calculated as a function of the projection value of the sampling point and a distance in the sample space between the interpolation point and the sampling point.

It can be noted that the above discussion is equally applicable for re-calculation into a fan geometry, by changing $(\phi, s)$ to $(\alpha, \beta)$.

7. Alternative Reconstruction Techniques in Standard Geometries

It is to be understood that the reference to Filtered Back Projection (FBP) herein is merely given as an example of a technique for reconstructing the attenuation field. There are many other known techniques that can be used for reconstruction, after re-calculation into a standard geometry, such as for instance ART, SIRT, SART and Fourier-transform based algorithms. More information about these and other algorithms can be found, e.g., in the above-mentioned books "The Mathematics of Computerized Tomography" by Natterer, and "Principles of Computerized Tomographic Imaging" by Kak and Slaney.

It should also be noted that it is possible to do an unfiltered back projection and perform the filtering on the reconstructed image.

Fourier-transform based algorithms give the promise of time complexities of $O(n^2 \cdot \log(n))$, i.e. a significant improvement. However, as stated by Kak and Slaney, the naïve algorithm may not suffice. The naïve algorithm is discussed by Natterer on pages 119-125, whereupon Natterer continues to present two different improved algorithms (on pages 125-127) that are stated to produce good results. The above-referenced article by Fourmont presents further algorithms that involve the use of FFT-based algorithms designed to handle uneven distribution of input data and/or output data.

It can also be noted that in certain implementations, it may be advantageous to perform a low-pass filtering of the updated set of projection values that results from the re-calculation into a standard geometry, before applying the reconstruction technique.

8. Concluding Remarks

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

Figure 29:
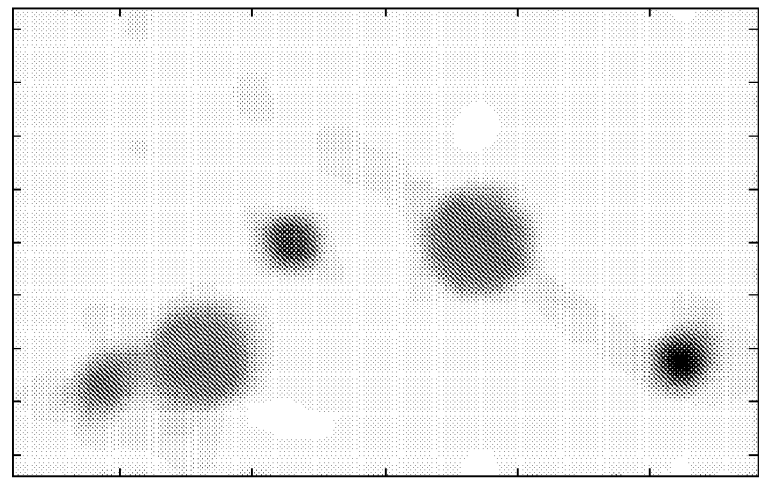
FIG. 29 shows the reconstructed attenuation field in FIG. 22F after image enhancement processing.

For example, the reconstructed attenuation field may be subjected to post-processing before the touch data extraction (step 48 in FIG. 4A). Such post-processing may involve different types of filtering, for noise removal and/or image enhancement. FIG. 29 illustrates the result of applying a Bayesian image enhancer to the reconstructed attenuation field in FIG. 23E. The enhanced attenuation field has merit values: $m_1=1.6433$ and $m_2=5.5233$. For comparison, the enhanced attenuation field obtained by applying the Bayesian image enhancer on the reconstructed attenuation field in FIG. 14D has merit values: $m_1=1.8536$ and $m_2=10.0283$. In both cases, a significant quality improvement is obtained.

Furthermore, it is to be understood that the inventive concept is applicable to any touch-sensitive apparatus that defines a fixed set of detection lines and operates by processing measured projection values for the detection lines according to any tomographic reconstruction algorithm that is defined for a standard geometry, where these standard geometry does not match the fixed set of detection lines. Thus, although the above description is given with reference to FBP algorithms, the inventive concept have a more general applicability.

It should also be emphasized that all the above embodiments, examples, variants and alternatives given with respect to interpolation, removal of detection lines, and estimation in gap regions are generally applicable to any type of emitter-sensor arrangement and irrespective of standard geometry.

Furthermore, the reconstructed attenuation field need not represent the distribution of attenuation coefficient values within the touch surface, but could instead represent the distribution of energy, relative transmission, or any other relevant entity derivable by processing of projection values given by the output signal of the sensors. Thus, the projection values may represent measured energy, differential energy (e.g. given by a measured energy value subtracted by a background energy value for each detection line), relative attenuation, relative transmission, a logarithmic attenuation, a logarithmic transmission, etc. The person skilled in the art realizes that there are other ways of generating projection values based on the output signal. For example, each individual projection signal included in the output signal may be subjected to a high-pass filtering in the time domain, whereby the thus-filtered projection signals represent background-compensated energy and can be sampled for generation of projection values.

Furthermore, all the above embodiments, examples, variants and alternatives given with respect to an FTIR system are equally applicable to a touch-sensitive apparatus that operates by transmission of other energy than light. In one example, the touch surface may be implemented as an electrically conductive panel, the emitters and sensors may be electrodes that couple electric currents into and out of the panel, and the output signal may be indicative of the resistance/impedance of the panel on the individual detection lines. In another example, the touch surface may include a material acting as a dielectric, the emitters and sensors may be electrodes, and the output signal may be indicative of the capacitance of the panel on the individual detection lines. In yet another example, the touch surface may include a material acting as a vibration conducting medium, the emitters may be vibration generators (e.g. acoustic or piezoelectric transducers), and the sensors may be vibration sensors (e.g. acoustic or piezoelectric sensors).

Still further, the inventive concept may be applied to improve tomographic reconstruction in any field of technology, such as radiology, archaeology, biology, geophysics, oceanography, materials science, astrophysics, etc, whenever the detection lines are mismatched to a standard geometry that forms the basis for the tomographic reconstruction algorithm. Thus, the inventive concept could be generally defined as a method for image reconstruction based on an output signal from a tomograph, the tomograph comprising a plurality of peripheral entry points and a plurality of peripheral withdrawal points, which between them define actual detection lines that extend across a measurement space to propagate energy signals from the entry points to the withdrawal points, at least one signal generator coupled to the entry points to generate the energy signals, and at least one signal detector coupled to the withdrawal points to generate the output signal, the method comprising: processing the output signal to generate a set of data samples, wherein the data samples are indicative of detected energy for at least a subset of the actual detection lines; processing the set of data samples to generate a set of matched samples, wherein the matched samples are indicative of estimated detected energy for fictitious detection lines that have a location in the measurement space that matches a standard geometry for tomographic reconstruction; and processing the set of matched samples by tomographic reconstruction to generate data indicative of a distribution of an energy-related parameter within at least part of the measurement space.

The invention claimed is:

1. A method of enabling touch determination based on an output signal from a touch-sensitive apparatus, the touch-sensitive apparatus including a panel configured to conduct signals from a plurality of peripheral incoupling points to a plurality of peripheral outcoupling points, thereby defining actual detection lines that extend across a surface portion of the panel between pairs of incoupling and outcoupling points, at least one signal generator coupled to the plurality of peripheral incoupling points to generate the signals, and at least one signal detector coupled to the plurality of peripheral outcoupling points to generate the output signal, the method comprising:

processing the output signal to generate a set of data samples in a two-dimensional sample space, wherein each data sample is representative of an actual detection line, and wherein the data samples are defined by a signal value indicative of detected energy for at least a subset of the actual detection lines and two dimensional values that define the location of the actual detection line on the surface portion;

processing the set of data samples to generate a set of matched samples at locations in the two-dimensional sample space, each matched sample having an estimated signal value, wherein the matched samples are indicative of estimated detected energy for fictitious detection lines that have a location on the surface portion that matches a standard geometry for tomographic reconstruction, the processing the set of data samples including, calculating the estimated signal values according to a two-dimensional interpolation function and based on the signal values of the data samples; and processing the set of matched samples by tomographic reconstruction to generate data indicative of a distribution of an energy-related parameter within at least part of the surface portion.

2. The method of claim 1, wherein the locations in the two-dimensional sample space correspond to the fictitious detection lines.

3. The method of claim 2, wherein the calculating the estimated signal values comprises, for each matched sample:

calculating a weighted contribution to the matched sample from each of at least a subset of the data samples, and aggregating the weighted contributions, wherein each weighted contribution is calculated as a function of the signal value of the data sample and a distance in the sample space between the matched sample and the data sample.

4. The method of claim 1, wherein each estimated signal value is calculated by interpolation of the signal values of neighboring data samples in the two-dimensional sample space.

5. The method of claim 1, wherein the processing the set of data samples further comprises:
obtaining the two-dimensional interpolation function, the two-dimensional interpolation function having nodes corresponding to the set of data samples.

6. The method of claim 1, further comprising:
receiving exclusion data identifying one or more data samples to be excluded, wherein the processing the data samples further includes,
identifying the node corresponding to each data sample to be excluded, re-designing the interpolation function without each thus-identified node, and
calculating the estimated signal values according to the re-designed interpolation function and based on the signal values of the data samples in the nodes of the re-designed interpolation function.

7. The method of claim 1, wherein the matched samples are arranged as at least one of rows and columns in the two-dimensional sample space.

8. The method of claim 7, wherein the matched samples are arranged with equidistant spacing within each of said at least one of rows and columns.

9. The method of claim 1, wherein the processing the set of data samples further comprises:
operating a two-dimensional Fourier transformation algorithm designed for irregularly sampled data on the set of data samples to generate a set of Fourier coefficients arranged in a Cartesian grid, and
calculating the estimated signal values by operating a two-dimensional inverse Fourier transformation algorithm on the set of Fourier coefficients to generate the set of matched samples.

10. The method of claim 1, wherein the processing the set of matched samples comprises:
applying one-dimensional high-pass filtering of the matched samples in the two-dimensional sample space to generate filtered samples, and
processing the filtered samples to generate a set of back projection values indicative of said distribution.

11. The method of claim 1, wherein the surface portion defines a sampling area in the two-dimensional sample space, and wherein, if the actual detection lines given by the geometric arrangement of incoupling and outcoupling points result in at least one contiguous region without data samples within the sampling area, the processing the set of data samples comprises:
obtaining a set of estimated sampling points within the contiguous region, and for each estimated sampling point,
identifying the location of a corresponding fictitious detection line on the surface portion,
identifying, for each intersection point between the corresponding fictitious detection line and the actual detection lines or between the corresponding fictitious detection line and the fictitious detection lines for the set of matched samples, an intersection point value as the smallest signal value of all data samples corresponding to the actual detection lines associated with the intersection point, and
calculating a signal value of the estimated sampling point as a function of the intersection point values.

12. The method of claim 11, wherein the signal value of the estimated sampling point is given by the largest intersection point value.

13. The method of claim 11, further comprising, for each estimated sampling point:
identifying a number of local maxima in the intersection point values, and
calculating the signal value of the estimated sampling point as a combination of the local maxima.

14. The method of claim 1, wherein the two-dimensional values comprise a rotation angle of the detection line in the plane of the panel, and a distance of the detection line in the plane of the panel from an origin.

15. The method of claim 1, wherein the two-dimensional values comprise an angular location of the incoupling or outcoupling point of the detection line, and a rotation angle of the detection line in the plane of the panel.

16. The method of claim 15, wherein the standard geometry is a fan geometry, wherein the touch surface has a non-circular perimeter, and wherein the angular location is defined by an intersection between the actual detection line and a fictitious circle arranged to circumscribe the touch surface.

17. The method of claim 1, wherein the standard geometry is one of a parallel geometry and a fan geometry.

18. The method of claim 1, wherein said signals comprise one of electrical energy, light, magnetic energy, sonic energy and vibration energy.

19. The method of claim 1, wherein the panel defines a touch surface and an opposite surface, wherein said at least one signal generator is arranged to provide light inside the panel such that the light propagates from the plurality of peripheral incoupling points by internal reflection between the touch surface and the opposite surface to the plurality of peripheral outcoupling points for detection by said at least one signal detector, and wherein the touch-sensitive apparatus is configured such that the propagating light is locally attenuated by one or more objects touching the touch surface.

20. A non-transitory computer-readable medium comprising computer code which, when executed on a data-processing system, is adapted to carry out the method of claim 1.

21. The method of claim 1, wherein a geometry of the actual detection lines associated with each of the plurality of peripheral incoupling points is defined by angles between each of the actual detection lines associated with the incoupling point and a length of each of the actual detection lines associated with the incoupling point.

22. The method of claim 1, wherein geometries of actual detection lines associated with at least a portion of the plurality of peripheral incoupling points are different.

23. A device for enabling touch determination based on an output signal of a touch-sensitive apparatus, said touch-sensitive apparatus including a panel configured to conduct signals from a plurality of peripheral incoupling points to a plurality of peripheral outcoupling points, thereby defining actual detection lines that extend across a surface portion of the panel between pairs of incoupling and outcoupling points, means for generating the signals at the plurality of peripheral incoupling points, and means for generating the output signal based on detected signals at the plurality of peripheral outcoupling points, said device comprising:
means for receiving the output signal;
means for processing the output signal to generate a set of data samples in a two-dimensional sample space, wherein each data sample is representative of an actual detection line, and wherein the data samples are defined by a signal value indicative of detected energy for at least a subset of the actual detection lines and two dimensional values that define the location of the actual detection line on the surface portion;

means for processing the set of data samples to generate a set of matched samples at locations in the two-dimensional sample space, each matched sample having an estimated signal value, wherein the matched samples are indicative of estimated detected energy for fictitious detection lines that have a location on the surface portion that matches a standard geometry for tomographic reconstruction, the means for processing the set of data samples including, means for calculating the estimated signal values according to a two-dimensional interpolation function and based on the signal values of the data samples; and means for processing the set of matched samples by tomographic reconstruction to generate data indicative of a distribution of an energy-related parameter within at least part of the surface portion.

24. A touch-sensitive apparatus, comprising:

the panel configured to conduct signals from a plurality of peripheral incoupling points to a plurality of peripheral outcoupling points, thereby defining actual detection lines that extend across a surface portion of the panel between pairs of incoupling and outcoupling points;

the means for generating the signals at the plurality of peripheral incoupling points;

the means for generating an output signal based on detected signals at the plurality of peripheral outcoupling points; and the device for enabling touch determination according to claim 23.

25. A touch-sensitive apparatus, comprising:

a panel configured to conduct signals from a plurality of peripheral incoupling points to a plurality of peripheral outcoupling points, thereby defining actual detection lines that extend across a surface portion of the panel between pairs of incoupling and outcoupling points;

at least one signal generator coupled to the plurality of peripheral incoupling points to generate the signals;

at least one signal detector coupled to the plurality of peripheral outcoupling points to generate an output signal; and a signal processor connected to receive the output signal and configured to:

process the output signal to generate a set of data samples in a two-dimensional sample space, wherein each data sample is representative of an actual detection line, and wherein the data samples are defined by a signal value indicative of detected energy for at least a subset of the actual detection lines and two dimensional values that define the location of the actual detection line on the surface portion, process the set of data samples to generate a set of matched samples at locations in the two-dimensional sample space, each matched sample having an estimated signal value, wherein the matched samples are indicative of estimated detected energy for fictitious detection lines that have a location on the surface portion that matches a standard geometry for tomographic reconstruction, and wherein the estimated signal values are calculated according to a two-dimensional interpolation function and based on the signal values of the data samples; and process the set of matched samples by tomographic reconstruction to generate data indicative of a distribution of an energy-related parameter within at least part of the surface portion.

* * * * *